(12) United States Patent
Pfeiffer

(10) Patent No.: US 10,464,635 B2
(45) Date of Patent: Nov. 5, 2019

(54) CHAINGUIDE

(71) Applicant: Wolf Tooth Components, LLC, Savage, MN (US)

(72) Inventor: Michael W. Pfeiffer, Savage, MN (US)

(73) Assignee: Wolf Tooth Components, LLC, Savage, MN (US)

( * ) Notice: Subject to any disclaimer, the term of this patent is extended or adjusted under 35 U.S.C. 154(b) by 206 days.

(21) Appl. No.: 15/659,606

(22) Filed: Jul. 25, 2017

(65) Prior Publication Data

US 2018/0022418 A1 Jan. 25, 2018

Related U.S. Application Data

(60) Provisional application No. 62/366,261, filed on Jul. 25, 2016.

(51) Int. Cl.
| | |
|---|---|
| *B62M 9/136* | (2010.01) |
| *F16H 7/18* | (2006.01) |
| *B62M 9/00* | (2006.01) |
| *B62J 13/00* | (2006.01) |

(52) U.S. Cl.
CPC .............. *B62M 9/136* (2013.01); *B62J 13/00* (2013.01); *F16H 7/18* (2013.01); *B62M 2009/007* (2013.01)

(58) Field of Classification Search
CPC ....... B62M 9/105; B62M 9/121; B62M 9/136
USPC ................................................. 474/140, 144
See application file for complete search history.

(56) References Cited

U.S. PATENT DOCUMENTS

| | | | | |
|---|---|---|---|---|
| 5,725,450 | A * | 3/1998 | Huskey | B62M 9/06 474/116 |
| 6,533,690 | B2 * | 3/2003 | Barnett | B62J 13/00 474/116 |
| D510,548 | S | 10/2005 | Wickliffe | |
| D635,062 | S | 3/2011 | Savola et al. | |
| 8,235,849 | B2 * | 8/2012 | Cranston | B62J 13/00 280/261 |
| 8,961,342 | B2 * | 2/2015 | Emura | B62M 9/136 474/140 |
| 8,968,129 | B2 * | 3/2015 | Emura | B62M 9/16 474/111 |
| 9,249,867 | B2 * | 2/2016 | Graziosi | B62M 9/16 |
| 2003/0100393 | A1 * | 5/2003 | Nanko | B62M 9/1342 474/80 |
| 2008/0032835 | A1 * | 2/2008 | Reynolds | B62M 9/136 474/80 |
| 2009/0062049 | A1 * | 3/2009 | Cranston | B62J 13/00 474/144 |
| 2013/0053195 | A1 * | 2/2013 | Emura | B62M 9/16 474/140 |
| 2013/0053196 | A1 * | 2/2013 | Emura | B62M 9/136 474/140 |

(Continued)

OTHER PUBLICATIONS

OneUp Components Chain Guide, ISCG05, [online], [retrieved Aug. 19, 2016], Retrieved from the internet: http://www.oneupcomponents.com/collections/allproducts/products/topguide, 3 pages.

*Primary Examiner* — William E Dondero
*Assistant Examiner* — Mark K Buse
(74) *Attorney, Agent, or Firm* — Dicke, Billig & Czaja, PLLC

(57) ABSTRACT

A chainguide includes a mounting bracket and a guide member supported by and infinitely laterally adjustable relative to the mounting bracket.

30 Claims, 30 Drawing Sheets

(56) References Cited

U.S. PATENT DOCUMENTS

| | | | |
|---|---|---|---|
| 2013/0217527 A1* | 8/2013 | Graziosi | B62M 9/16 474/140 |
| 2014/0349793 A1* | 11/2014 | Emura | B62M 9/134 474/80 |
| 2015/0099599 A1* | 4/2015 | Lazzarin | B62M 9/136 474/80 |
| 2016/0265633 A1* | 9/2016 | Miles | B62M 9/136 |
| 2017/0045121 A1 | 2/2017 | Staples | |
| 2018/0265170 A1* | 9/2018 | Inoue | B62M 9/1342 |

* cited by examiner

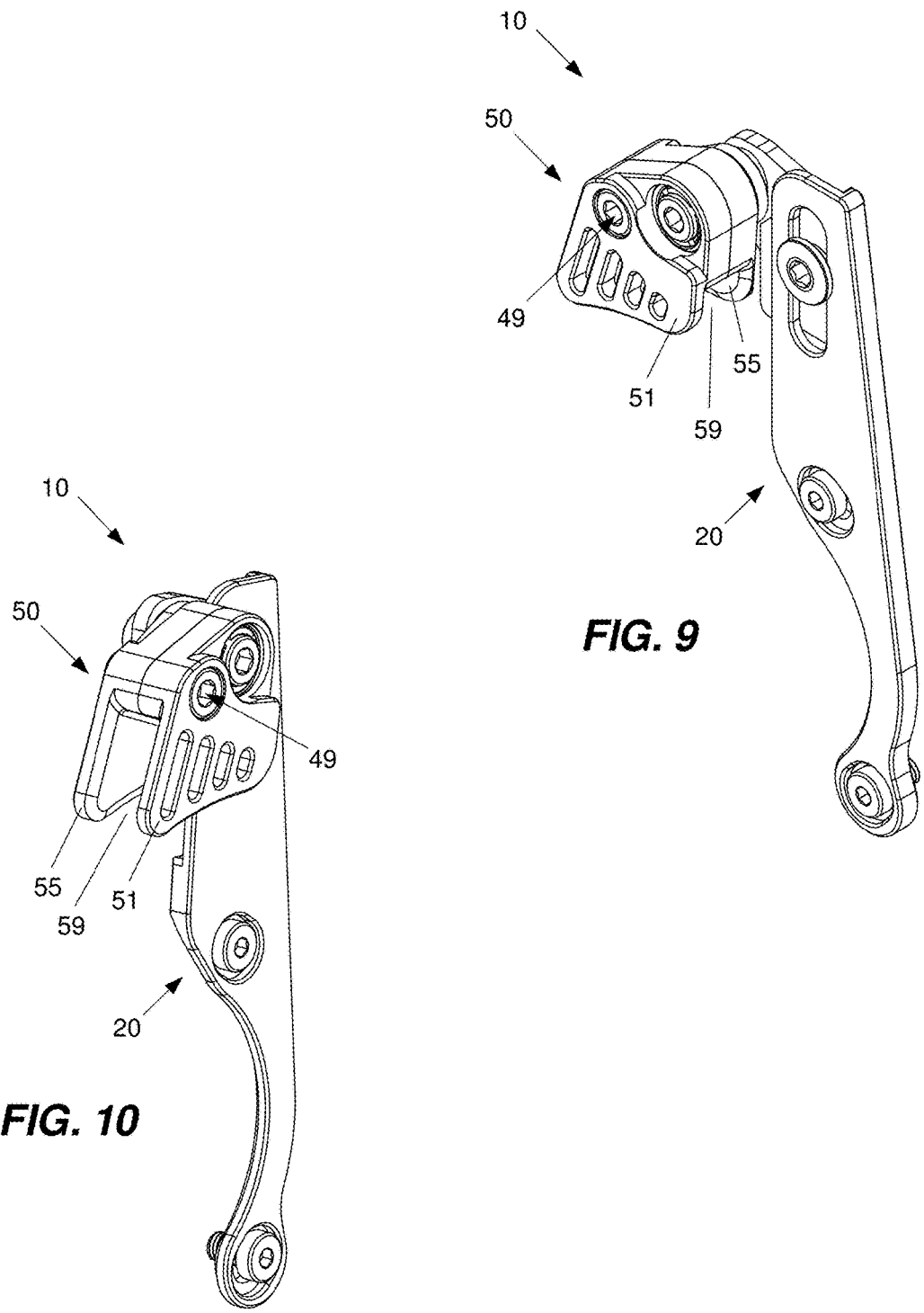

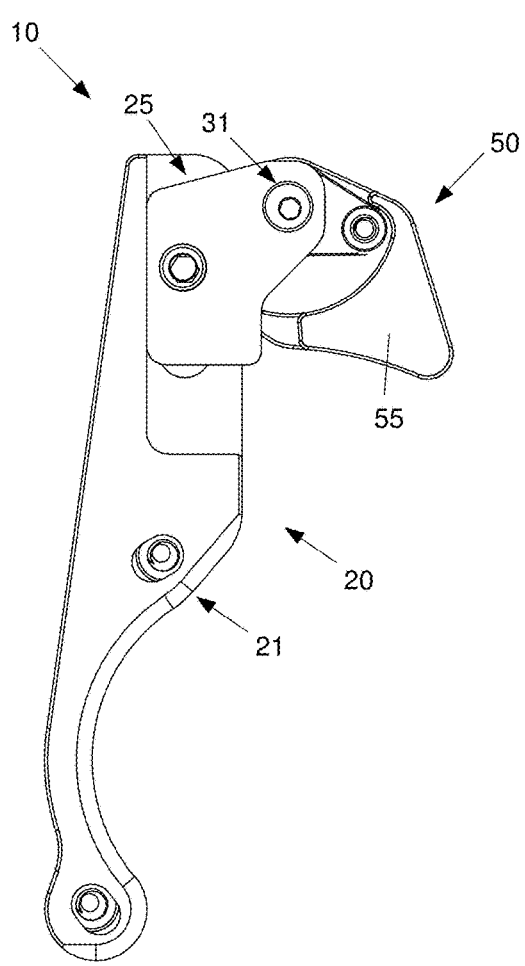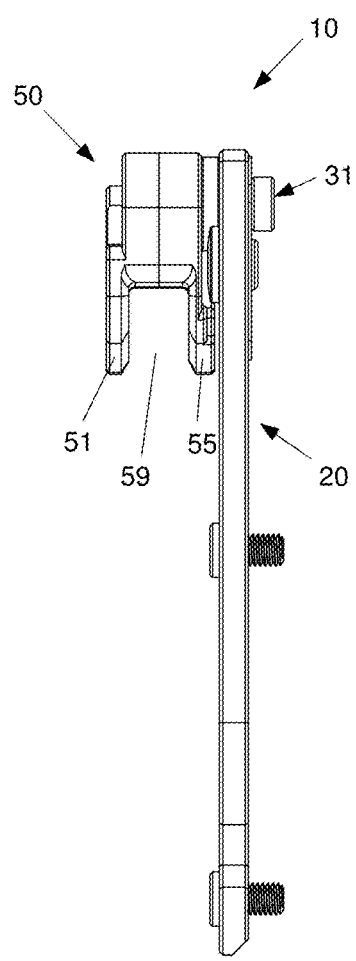
FIG. 11
FIG. 12

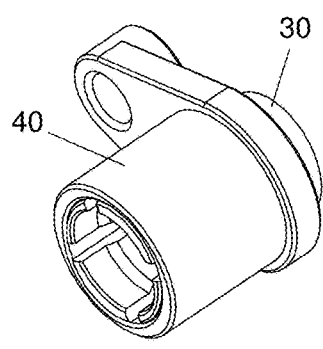 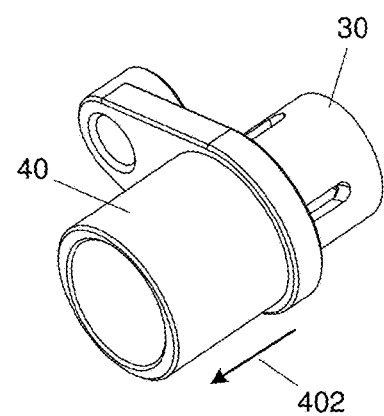
FIG. 17a  FIG. 17b

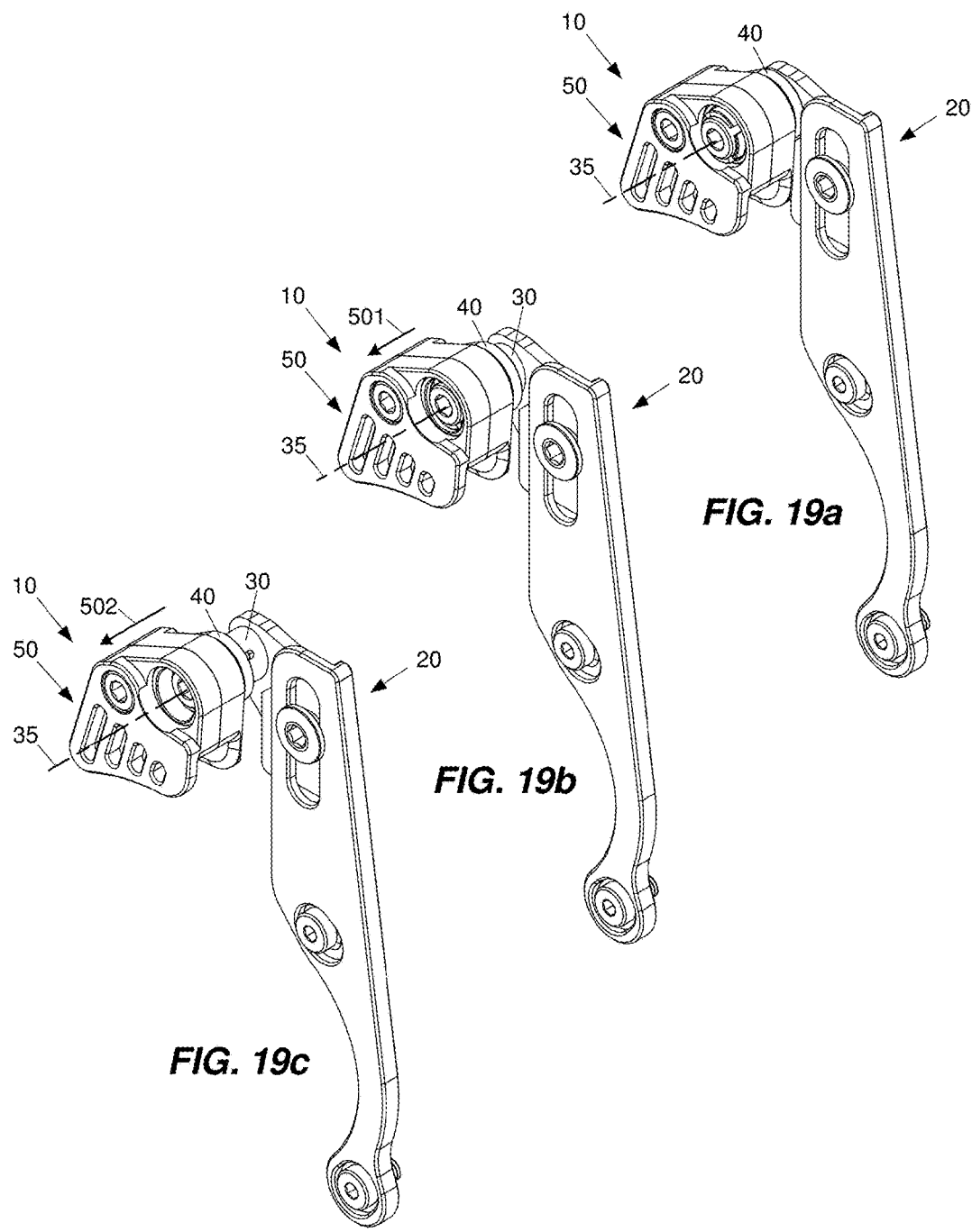

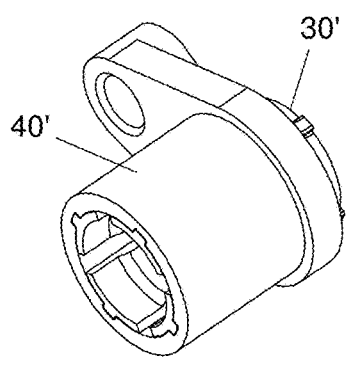 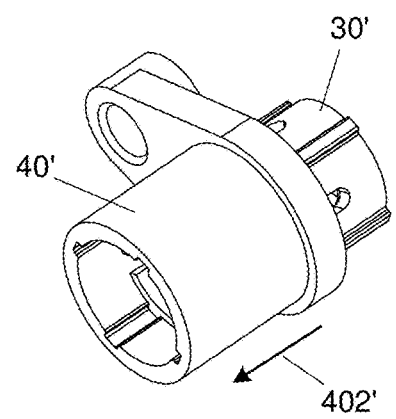
FIG. 30a  FIG. 30b

CHAINGUIDE

CROSS-REFERENCE TO RELATED APPLICATIONS

This application claims priority under 35 U.S.C. § 119(e) to U.S. Provisional Patent Application Ser. No. 62/366,261 filed on Jul. 25, 2016, and incorporated herein by reference.

BACKGROUND

The present disclosure relates generally to a chainguide and, more specifically, relates to a chainguide for retaining a chain on a chainring of a bicycle.

BRIEF DESCRIPTION OF THE DRAWINGS

FIG. 9 is a right-front perspective view of the chainguide of FIG. 1.

FIG. 10 is a left-front perspective view of the chainguide of FIG. 1.

FIG. 11 is a back view of the chainguide of FIG. 1.

FIG. 12 is a right view of the chainguide of FIG. 1.

FIGS. 17a, 17b are perspective views of a portion of the chainguide of FIG. 1, illustrating examples of different positions of a guide sleeve of the chainguide.

FIGS. 19a, 19b, 19c are right-front perspective views of the chainguide of FIG. 1, illustrating examples of different axial or lateral positions of a guide member of the chainguide.

FIGS. 30a, 30b are perspective views of a portion of the chainguide of FIGS. 27, 28, illustrating examples of different positions of a guide sleeve of the chainguide.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
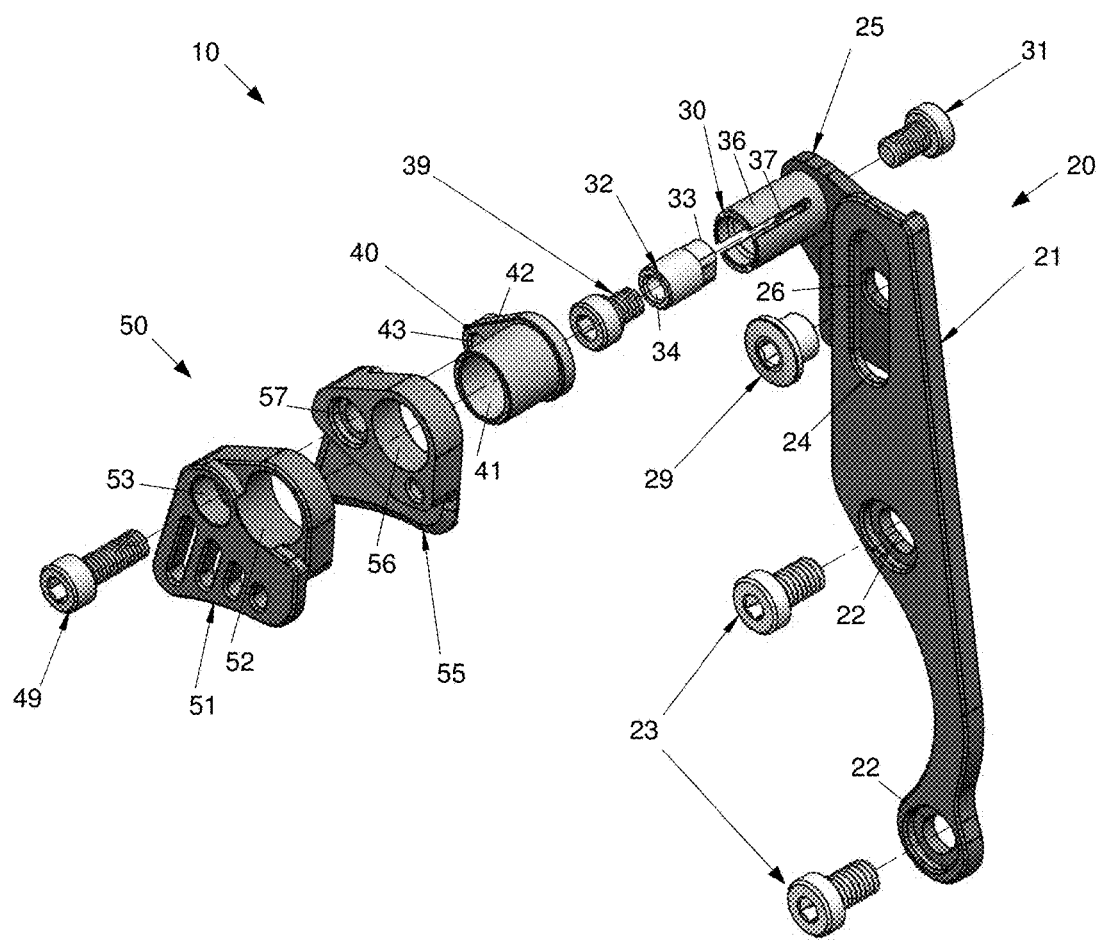
FIG. 1 is an exploded right-front perspective view of an example of a chainguide in accordance with the present disclosure.
Figure 2:
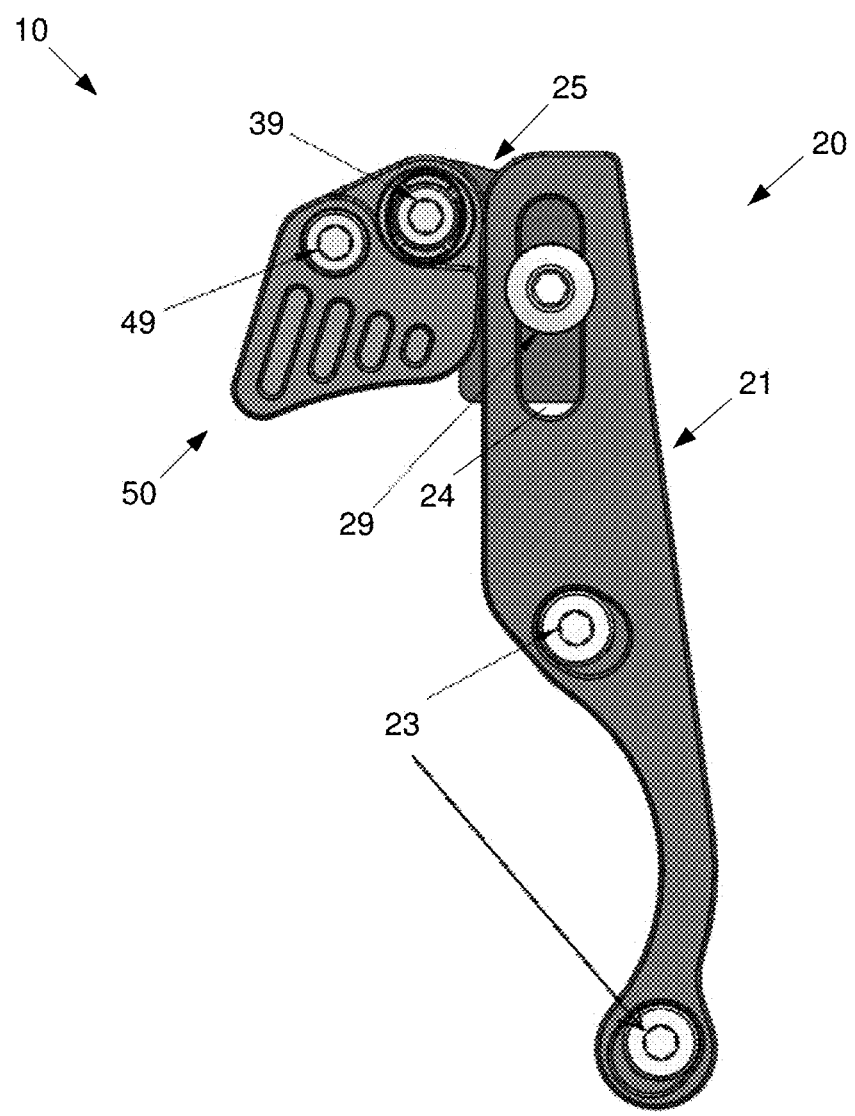
FIG. 2 is a front view of the chainguide of FIG. 1.

FIG. 1 is an exploded right-front perspective view of an example of a chainguide 10 in accordance with the present disclosure, and FIG. 2 is a front view of chainguide 10. In one example, chainguide 10 includes a mounting bracket 20, an expanding mandrel 30, a guide sleeve 40, and a guide member 50. As described herein, expanding mandrel 30 extends from mounting bracket 20, guide sleeve 40 is supported by expanding mandrel 30, and guide member 50 is supported by guide sleeve 40.

In the illustrated example, mounting bracket 20 includes a lower bracket 21 and an upper bracket 25. In one implementation, lower bracket 21 includes mounting holes 22 which receive anchor bolts 23 for mounting of lower bracket 21, as described herein. In one implementation, lower bracket 21 includes an adjustment slot 24 for vertical adjustment of upper bracket 25 (and guide member 50), as described herein.

In the illustrated example, upper bracket 25 is secured to lower bracket 21 and is vertically adjustable relative to lower bracket 21. In one implementation, upper bracket includes a threaded hole 26 such that a vertical adjusting bolt 29 is threaded into threaded hole 26 through adjustment slot 24 of lower bracket 21 to secure upper bracket 25 to lower bracket 21. By loosening (and tightening) vertical adjusting bolt 29, upper bracket 25 (and guide member 50) may be vertically adjusted relative to lower bracket 21.

In the illustrated example, expanding mandrel 30 is secured to mounting bracket 20 including, more specifically, upper bracket 25 of mounting bracket 20. In one implementation, expanding mandrel 30 is secured to upper bracket 25 by a mandrel fixing bolt 31 threaded into an end 33 of a mandrel fixing nut 32 inserted in expanding mandrel 30. In one implementation, expanding mandrel 30 is formed of a cylindrical member 36 having lengthwise reliefs 37 formed therein. As such, as described herein, a mandrel expanding bolt 39, such as a conical seat bolt, is threaded into an opposite end 34 of mandrel fixing nut 32 to expand expanding mandrel 30 (and fix or secure a lateral position of guide member 50).

In the illustrated example, guide sleeve 40 has a hole 41 therethrough to receive expanding mandrel 30 such that guide sleeve 40 is slidably positionable on expanding mandrel 30. More specifically, as described herein, guide sleeve 40 is laterally adjustable on expanding mandrel 30. In addition, as described herein, guide sleeve 40 is non-rotatable relative to expanding mandrel 30.

In the illustrated example, guide member 50 receives guide sleeve 40 and, in one implementation, includes an outer guide 51 and an inner guide 55. In the illustrated example, outer guide 51 and inner guide 55 each have respective holes 52 and 56 therethrough to receive guide sleeve 40. As such, as described herein, guide member 50 is rotatable relative to guide sleeve 40 about holes 52 and 56.

In one implementation, guide member 50, including outer guide 51 and inner guide 55, is secured to guide sleeve 40 by a guide fixing bolt 49 inserted through respective fixing holes 53 and 57 of outer guide 51 and inner guide 55 and threaded into a threaded hole 43 formed in a tab 42 extended from guide sleeve 40. As such, as described herein, guide member 50 is selectively secured to guide sleeve 44 for non-rotation by guide fixing bolt 49.

Figure 3:
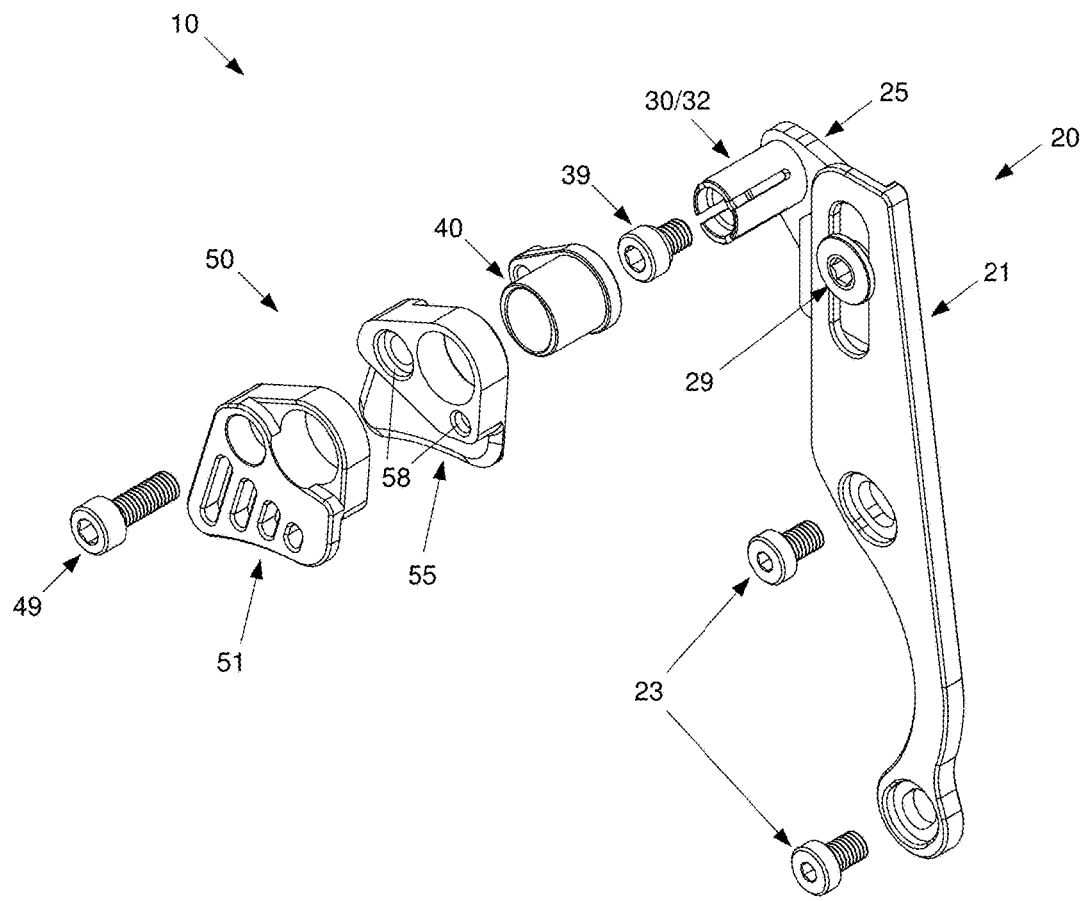
FIG. 3 is an exploded right-front prospective view of the chainguide of FIG. 1.
Figure 4:
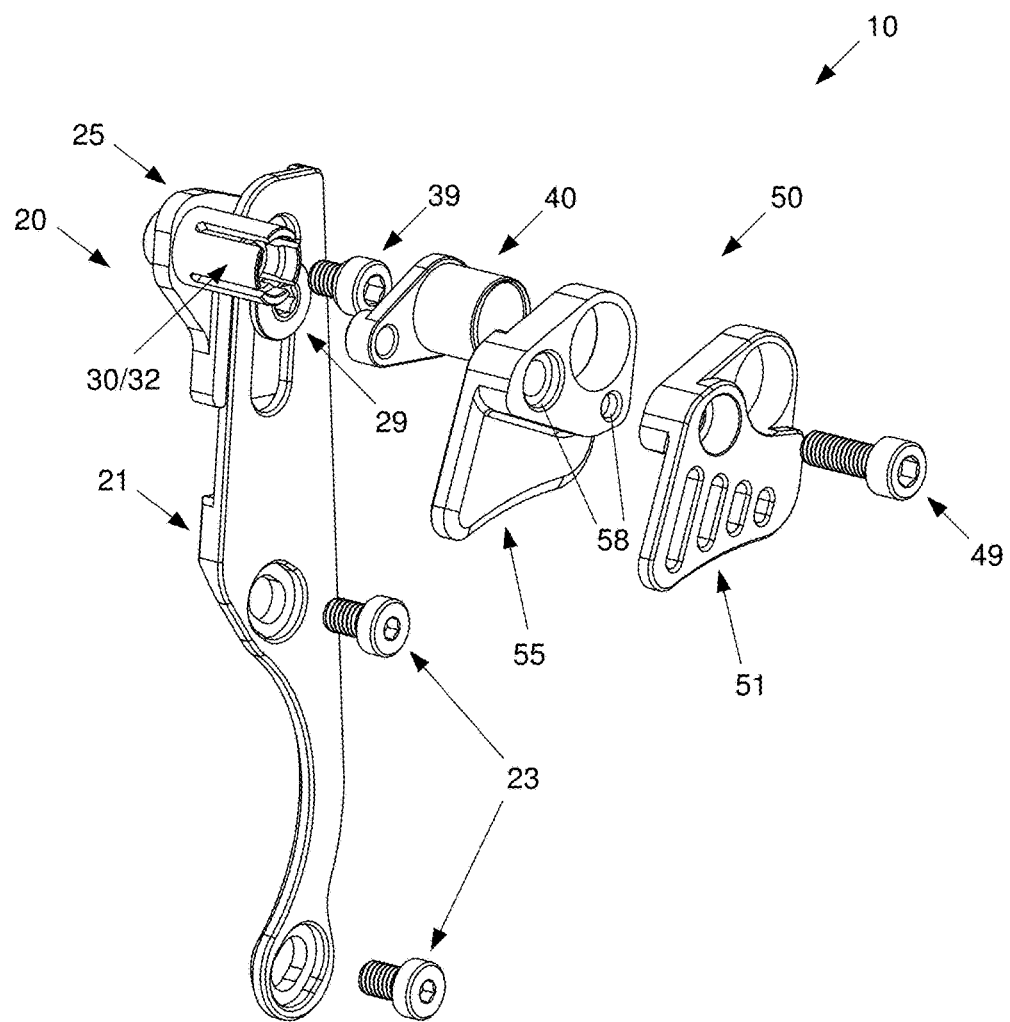
FIG. 4 is an exploded left-front perspective view of the chainguide of FIG. 1.
Figure 5:
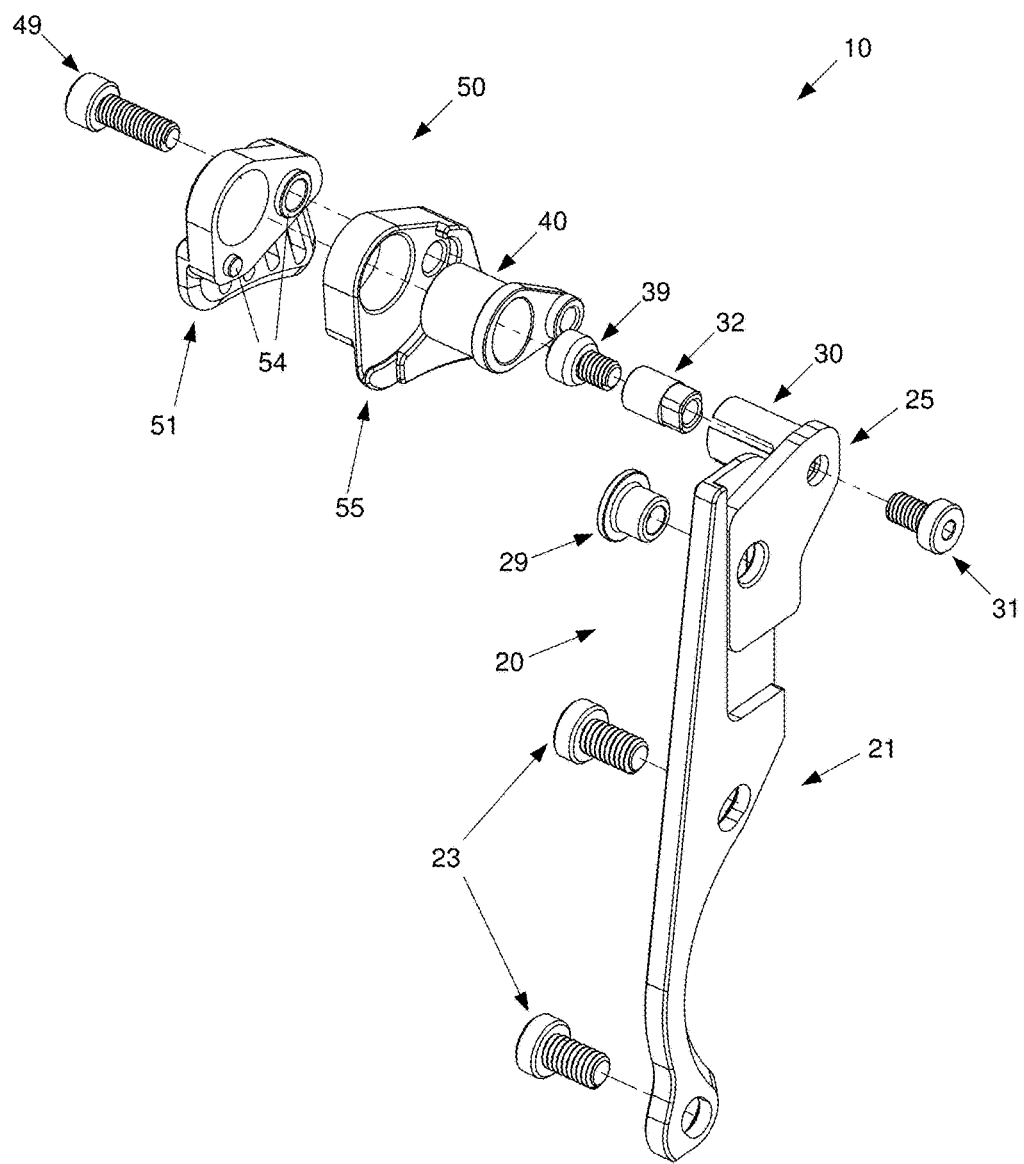
FIG. 5 is an exploded right-back perspective view of the chainguide of FIG. 1.

FIG. 3 is an exploded right-front prospective view of chainguide 10, FIG. 4 is an exploded left-front perspective view of chainguide 10, and FIG. 5 is an exploded right-back perspective view of chainguide 10. As illustrated in the example of FIGS. 3, 4, 5, outer guide 51 and inner guide 55 are mated and aligned by one or more than one projection 54, such as a tab, pin or ring, extended from and corresponding recess 58, such as a slot, hole or countersink, formed in, respectively, mating surfaces of outer guide 51 and inner guide 55.

Figure 6:
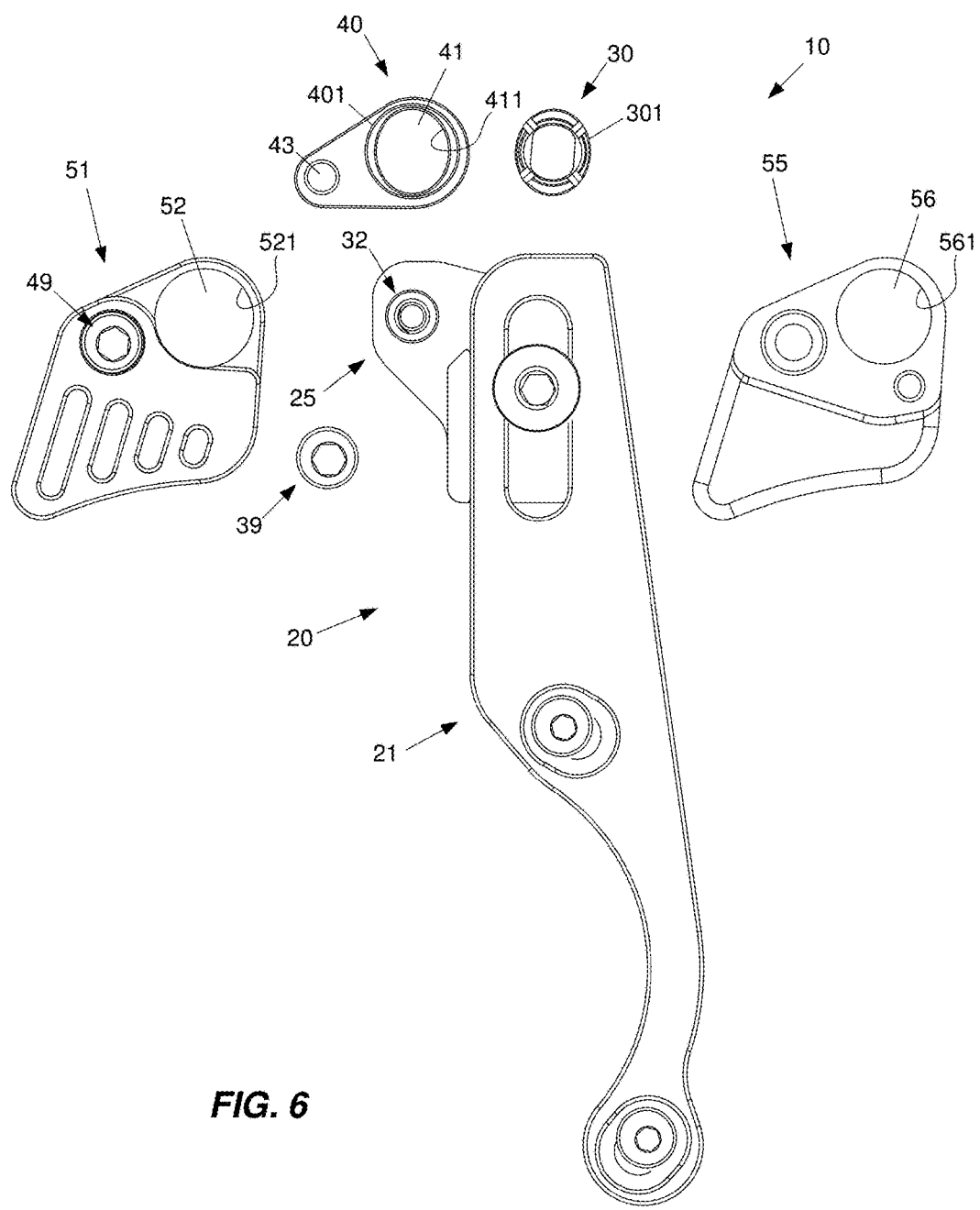
FIG. 6 is a disassembled front view of the chainguide of FIG. 1.
Figure 8:
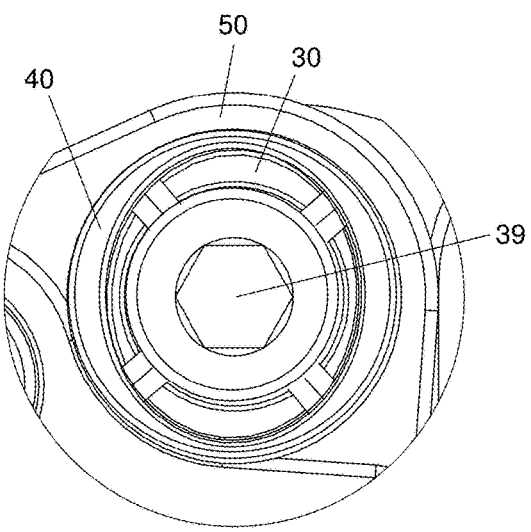
FIG. 8 is an enlarged view of the area within the broken line circle of FIG. 7.
Figure 7:
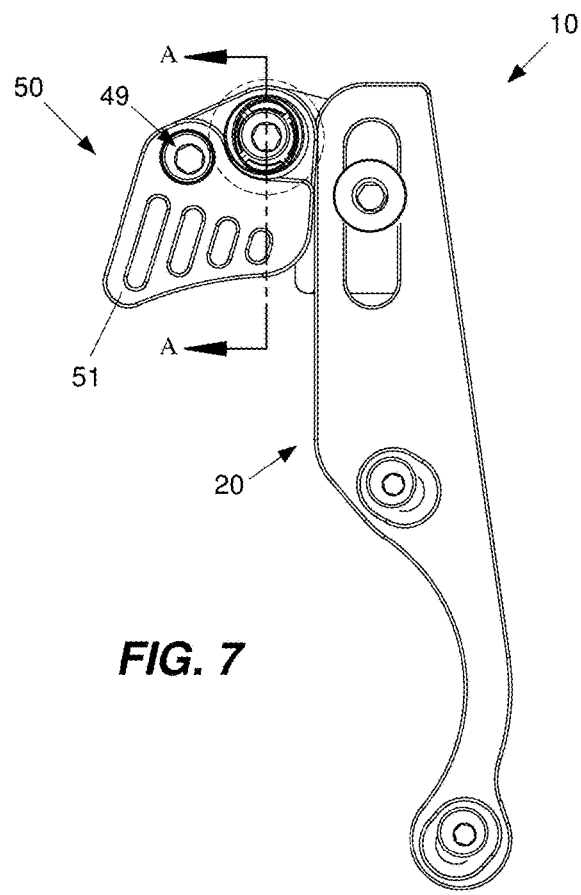
FIG. 7 is an assembled front view of the chainguide of FIG. 1.

FIG. 6 is a (partially) disassembled front view of chainguide 10, FIG. 7 is an assembled front view of chainguide 10, and FIG. 8 is an enlarged view of the area within the broken line circle of FIG. 7. As illustrated in the example of FIGS. 6, 7, 8, expanding mandrel 30 has an elliptical outer profile 301 and hole 41 of guide sleeve 40 has a corresponding elliptical (inner) profile 411. As such, expanding mandrel 30 and guide sleeve 40 have an elliptical coupling such that, with guide sleeve 40 mounted on and supported by expanding mandrel 30, guide sleeve 40 is non-rotatable relative to expanding mandrel 30. In addition, as illustrated in the example of FIGS. 6, 7, 8, guide sleeve 40 has a circular outer profile 401 and hole 52 of outer guide 51 and hole 56 of inner guide 55 each have a corresponding circular (inner) profile 521 and 561. As such, with guide member 50, including outer guide 51 and inner guide 55, mounted on and supported by guide sleeve 40, guide member 50 is rotatable relative to and about guide sleeve 40 (and rotatable relative to expanding mandrel 30 and mounting bracket 20).

Figure 13:
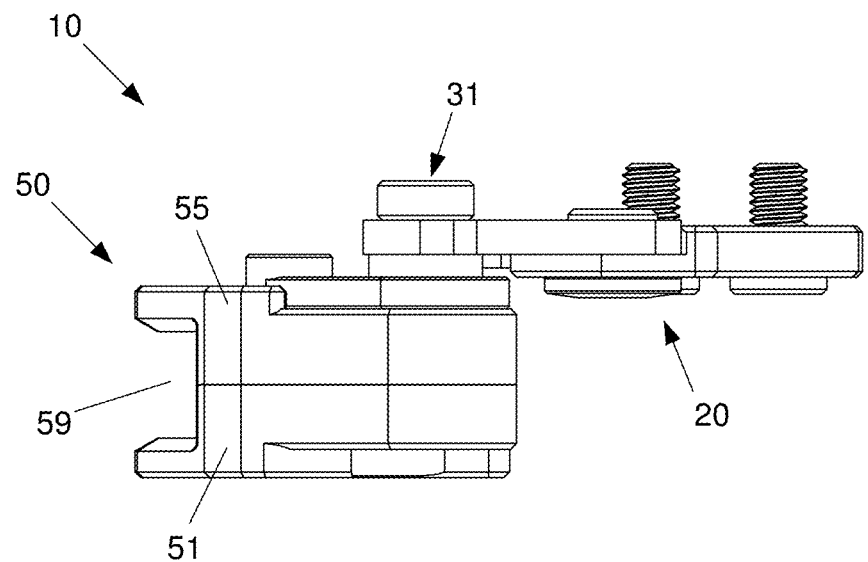
FIG. 13 is a top view of the chainguide of FIG. 1.
Figure 14:
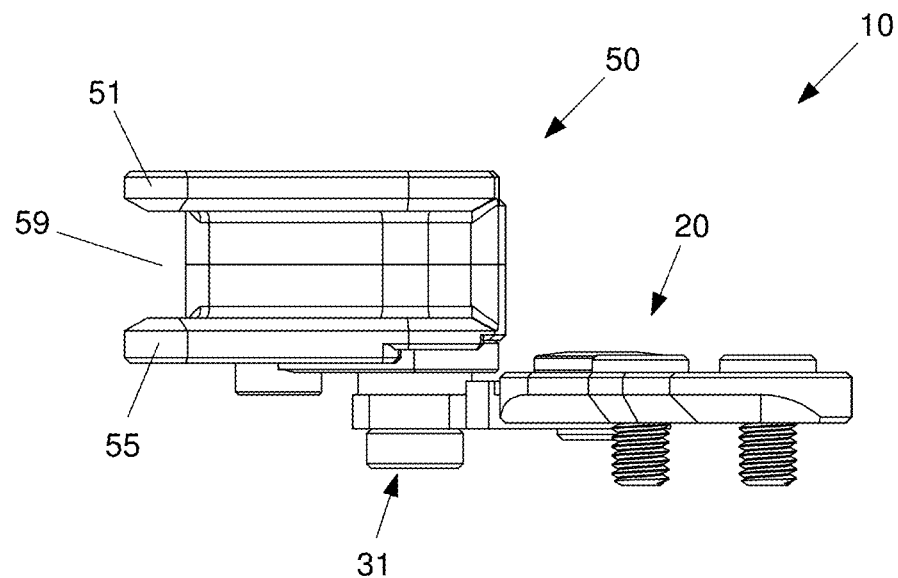
FIG. 14 is a bottom view of the chainguide of FIG. 1.

FIG. 9 is a right-front perspective view of chainguide 10, FIG. 10 is a left-front perspective view of chainguide 10, FIG. 11 is a back view of chainguide 10, FIG. 12 is a right view of chainguide 10, FIG. 13 is a top view of chainguide 10, and FIG. 14 is a bottom view of chainguide 10. As illustrated in the example of FIGS. 9, 10, 11, 12, 13, 14, outer guide 51 and inner guide 55 are mated (and secured together by guide fixing bolt 49 extended through respective fixing holes 53 and 57 and threaded into threaded hole 43 of guide sleeve 40) to form a guide channel 59 therebetween. As such, and as described herein, guide channel 59 provides a channel for guiding (e.g., retaining or restraining) a chain. Although outer guide 51 and inner guide 55 are illustrated and described as being formed separately, outer guide 51 and inner guide 55 may be integrally or unitarily formed as one piece.

Figure 15:
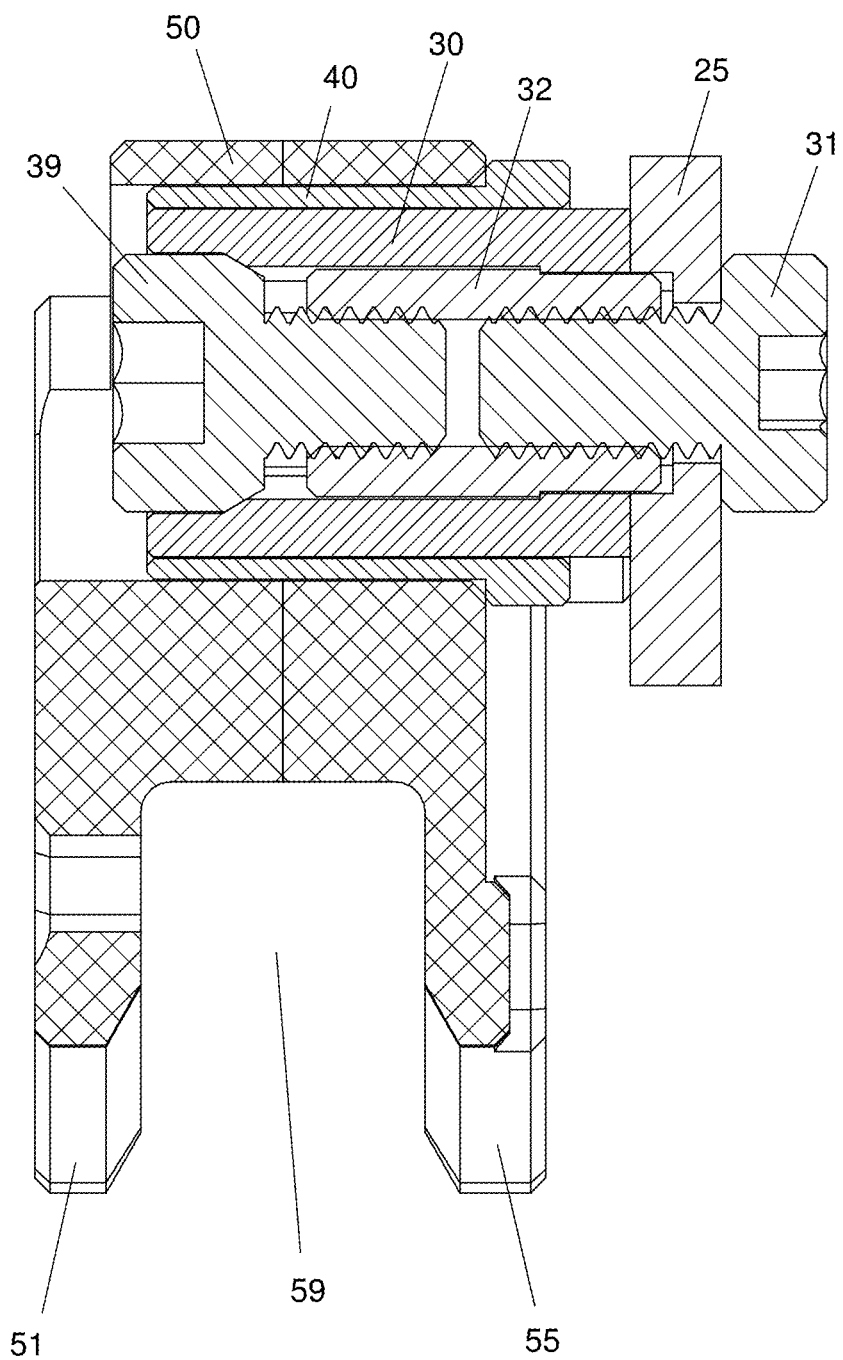
FIG. 15 is a cross-sectional view from the perspective of line A-A of FIG. 7.
Figures 16A, 16B:
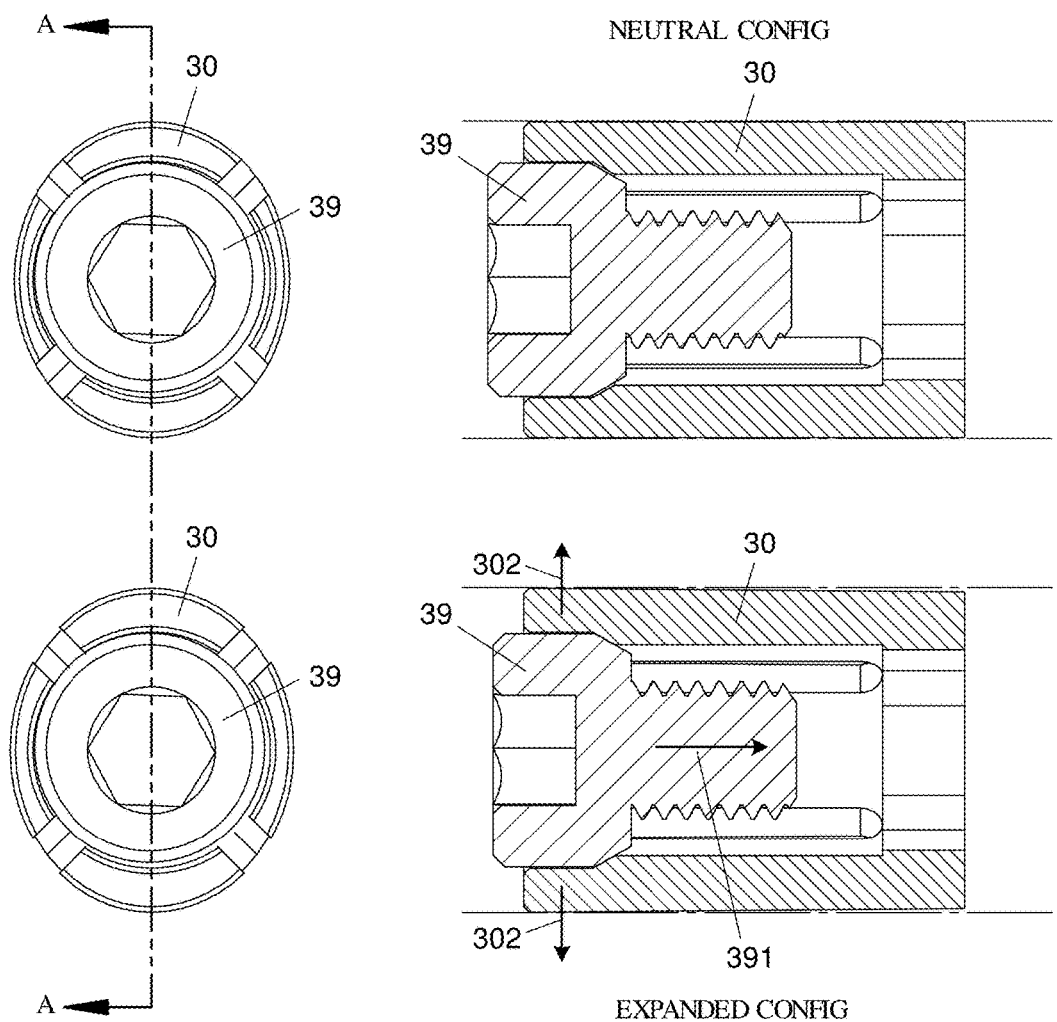
FIGS. 16a, 16b are front and corresponding cross-sectional views of a portion of the chainguide of FIG. 1, illustrating examples of different configurations or states of an expanding mandrel of the chainguide.

FIG. 15 is a cross-sectional view from the perspective of line A-A of FIG. 7, FIGS. 16a, 16b are front and corresponding cross-sectional views of a portion of chainguide 10, illustrating examples of different configurations or states of expanding mandrel 30 of chainguide 10, and FIGS. 17a, 17b are perspective views of a portion of chainguide 10, illustrating examples of different positions of guide sleeve 40 of chainguide 10. As illustrated in the example of FIG. 15, guide member 50 (including outer guide 51 and inner guide 55) is supported by guide sleeve 40, and guide sleeve 40 is supported by expanding mandrel 30. In addition, expanding mandrel 30 is secured to upper bracket 25 by mandrel fixing bolt 31 and mandrel fixing nut 32, and mandrel expanding bolt 39 is threaded into mandrel fixing nut 32 to expand expanding mandrel 30, as described herein.

As illustrated in the example of FIGS. 16a, 16b, expanding mandrel 30 has different configurations or states, including a neutral (or unexpanded) configuration or state, as illustrated in FIG. 16a, and an expanded (or locking) configuration or state, as illustrated in FIG. 16b. As illustrated in the example of FIG. 16a, in the neutral configuration or state, expanding mandrel 30 is relaxed and not expanded such that guide sleeve 40 is slidable relative to expanding mandrel 30. More specifically, as illustrated in the example of FIGS. 17a, 17b, in the neutral configuration or state, guide sleeve 40 is slidable along expanding mandrel 30, as represented by arrow 402 (including in the reverse direction). Thus, as described herein, guide sleeve 40 (with guide member 50 supported thereon) is laterally or axially adjustable relative to expanding mandrel 30. As illustrated in the example of FIG. 16b, as mandrel expanding bolt 39 is advanced in the direction of arrow 391 (i.e., threaded into mandrel fixing nut 32 (FIG. 15)), mandrel expanding bolt 39 expands expanding mandrel 30 in the direction of arrows 302. As such, in the expanded configuration or state, expanding mandrel 30 creates an interference fit with guide sleeve 40 such that guide sleeve 40 is locked or secured in position on expanding mandrel 30.

Figure 18A:
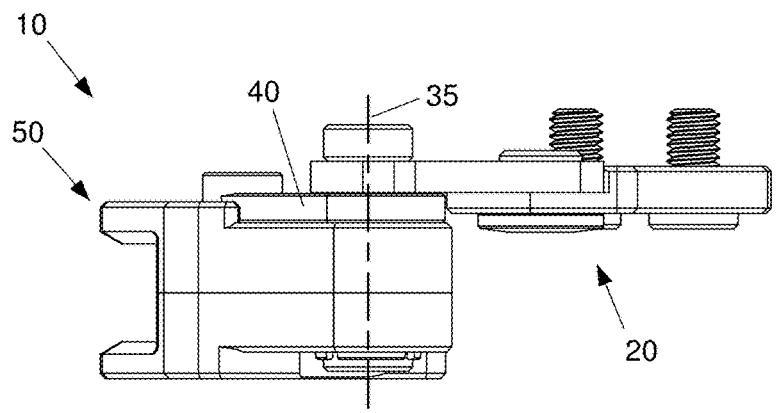
FIGS. 18a, 18b, 18c are top views of the chainguide of FIG. 1, illustrating examples of different axial or lateral positions of a guide member of the chainguide.
Figure 18B:
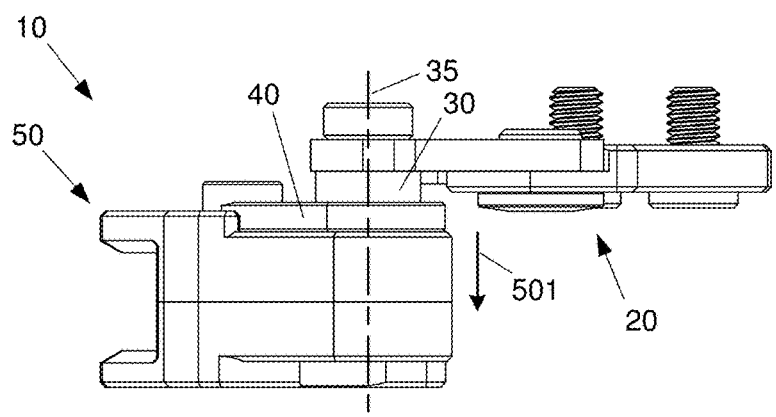
Figure 18C:
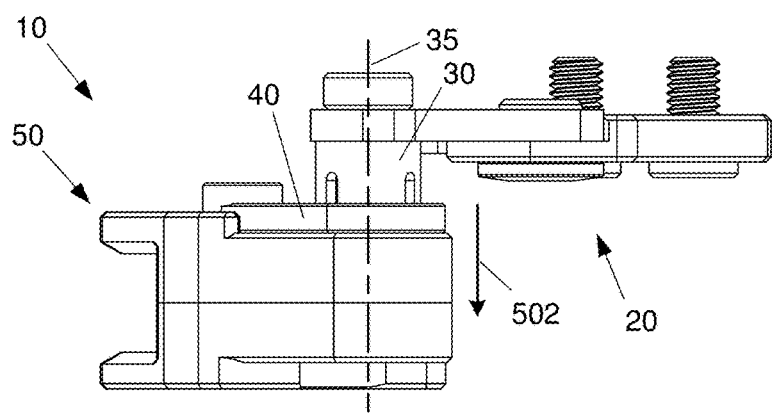

FIGS. 18a, 18b, 18c are top views of chainguide 10, illustrating examples of different axial or lateral positions of guide member 50 of chainguide 10, and FIGS. 19a, 19b, 19c are right-front perspective views of chainguide 10, illustrating examples of different axial or lateral positions of guide member 50 of chainguide 10. As illustrated in the example of FIGS. 18a, 18b, 18c and 19a, 19b, 19c, guide sleeve 40 and guide member 50 together (i.e., jointly) are axially or laterally adjustable relative to expanding mandrel 30 (and mounting bracket 20). For example, as illustrated in the example of FIGS. 18a and 19a, guide member 50, as supported by guide sleeve 40, is at one axial or lateral position relative to expanding mandrel 30 and mounting bracket 20. And, as illustrated in the example of FIGS. 18b and 19b, guide member 50, as supported by guide sleeve 40, is moved laterally relative to mounting bracket 20 by sliding of guide sleeve 40 along expanding mandrel 30, including, more specifically, along a lateral axis 35 of expanding mandrel 30, as represented by arrow 501, such that guide member 50, as supported by guide sleeve 40, is at another axial or lateral position relative to expanding mandrel 30 and mounting bracket 20. And, as illustrated in the example of FIGS. 18c and 19c, guide member 50, as supported by guide sleeve 40, is further moved laterally relative to mounting bracket 20 by sliding of guide sleeve 40 further along expanding mandrel 30, including, more specifically, further along lateral axis 35 of expanding mandrel 30, as represented by arrow 502, such that guide member 50, as supported by guide sleeve 40, is at another axial or lateral position relative to expanding mandrel 30 and mounting bracket 20.

Although illustrated at three different axial or lateral positions, guide member 50, as supported by guide sleeve 40, may be infinitely or continuously positioned along expanding mandrel 30 to establish infinite or continuous adjustment of guide member 50 relative to mounting bracket 20.

Figure 20A:
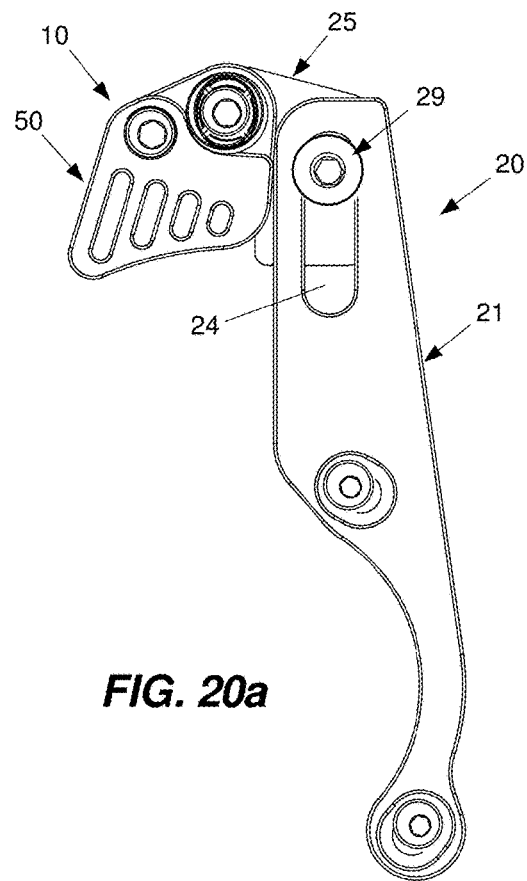
FIGS. 20a, 20b are front views of the chainguide of FIG. 1, illustrating examples of different vertical positions of a guide member of the chainguide.
Figure 20B:
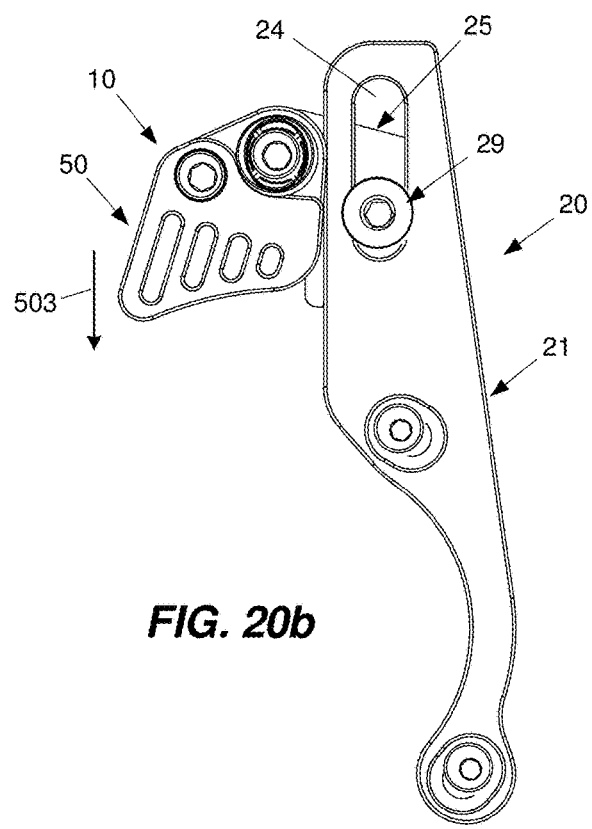
Figure 21:
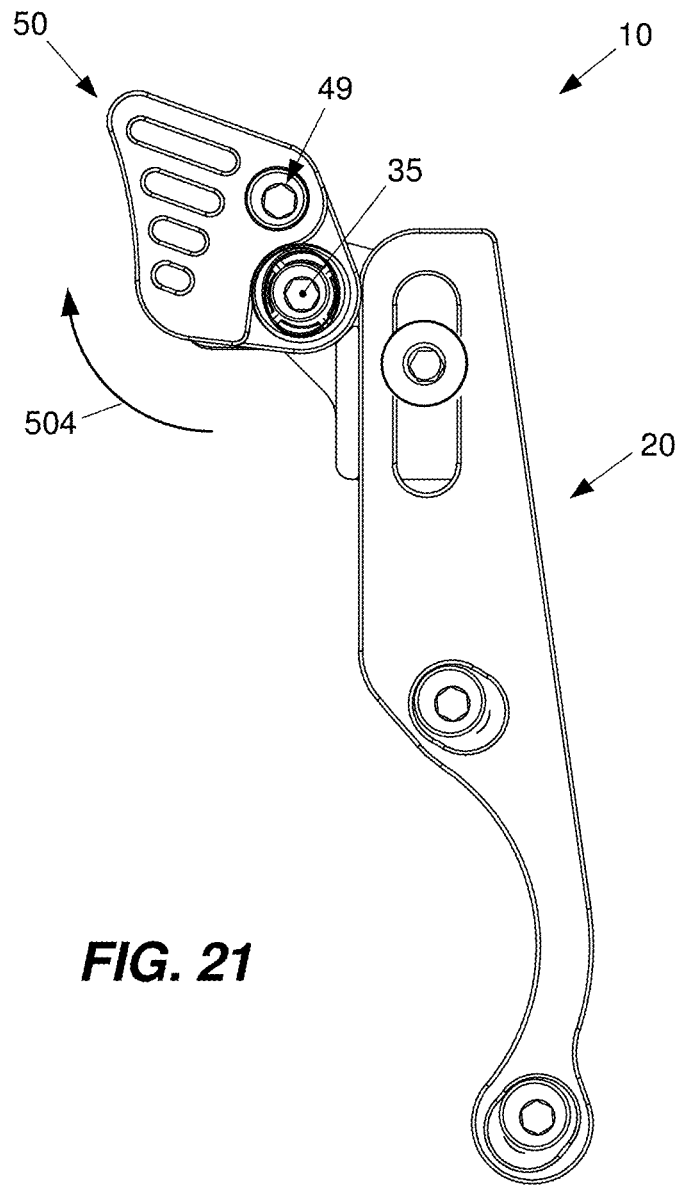
FIG. 21 is a front view of the chainguide of FIG. 1, illustrating an example of a rotated position of a guide member of the chainguide.

FIGS. 20a, 20b are front views of chainguide 10, illustrating examples of different vertical positions of guide member 50 of chainguide 10, and FIG. 21 is a front view of chainguide 10, illustrating an example of a rotated position of guide member 50 of chainguide 10. As illustrated in the example of FIGS. 20a, 20b, guide member 50 is vertically adjustable at mounting bracket 20. For example, with vertical adjusting bolt 29 loosened, guide member 50, as secured to upper bracket 25, is moved vertically relative to lower bracket 21 by sliding of vertical adjusting bolt 29, as threaded into upper bracket 25, within adjustment slot 24 of lower bracket 21, as represented by arrow 503 (including in the reverse direction). In addition, as illustrated in the example of FIG. 21, guide member 50 is rotatable relative to mounting bracket 20. For example, with guide fixing bolt 49 loosened, guide member 50, as supported by guide sleeve 40, is rotatable relative to guide sleeve 40. More specifically, guide member 50 is rotated about axis 35 of expanding mandrel 30, as represented by arrow 504, to establish an "open" position of guide member 50. As such, guide member 50 is rotated in an opposite direction to establish a "closed" position of guide member 50 (e.g., FIGS. 20a, 20b).

Figure 22:
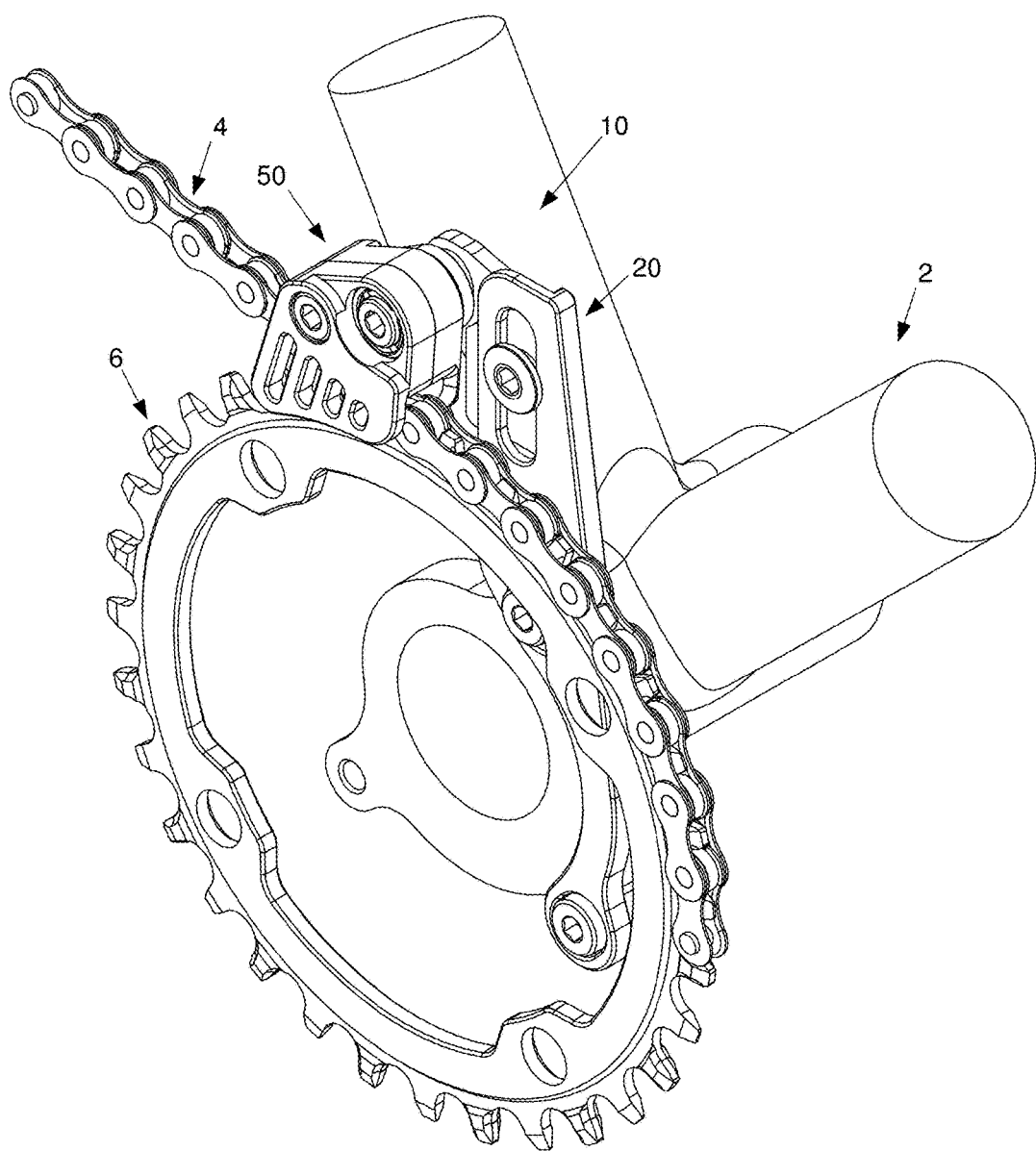
FIG. 22 is a right-front perspective view of an example of a chainguide in accordance with the present disclosure secured to a bicycle and positioned to retain a chain on a chainring of the bicycle.
Figure 23:
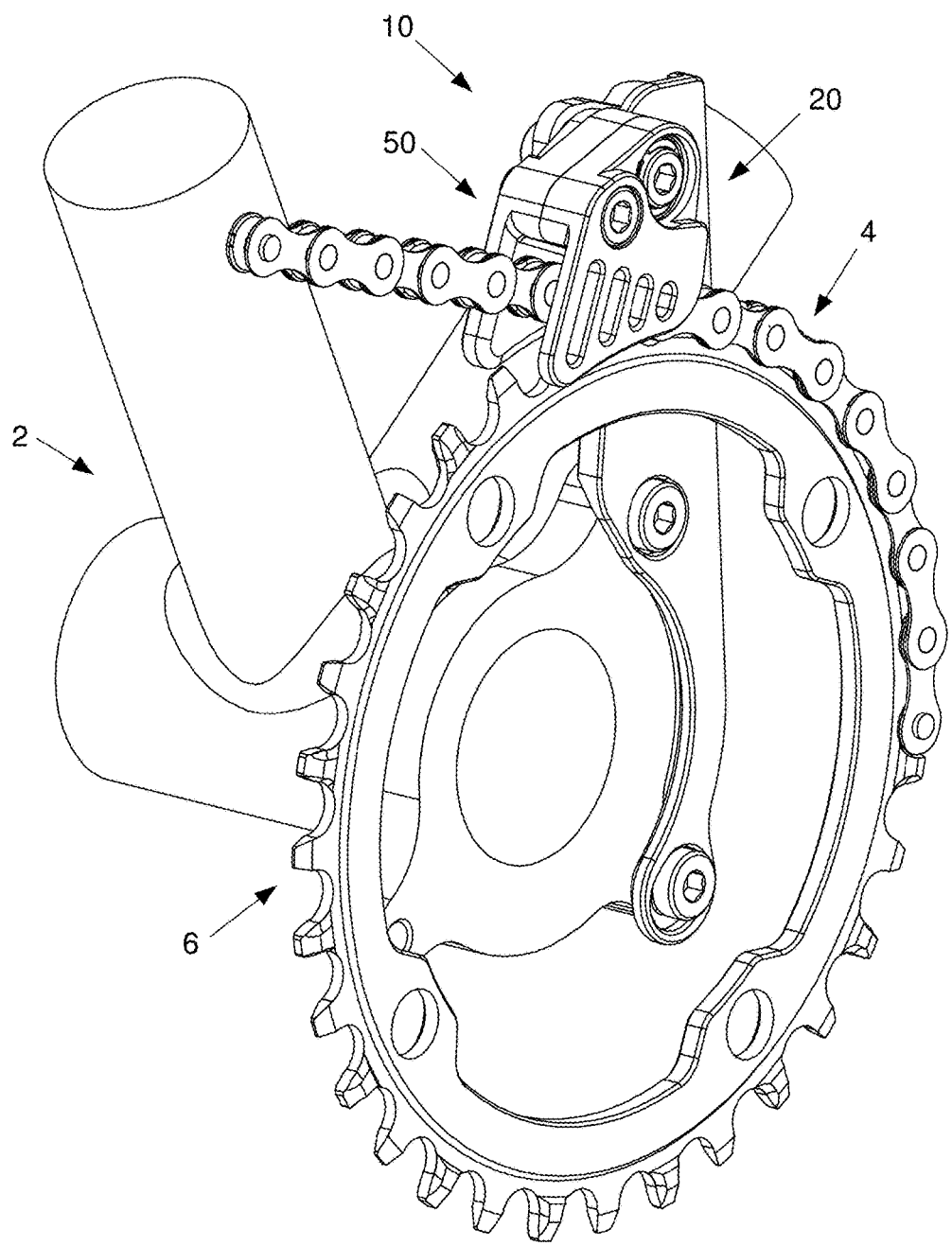
FIG. 23 is a left-front perspective view of the chainguide of FIG. 22.
Figure 25:
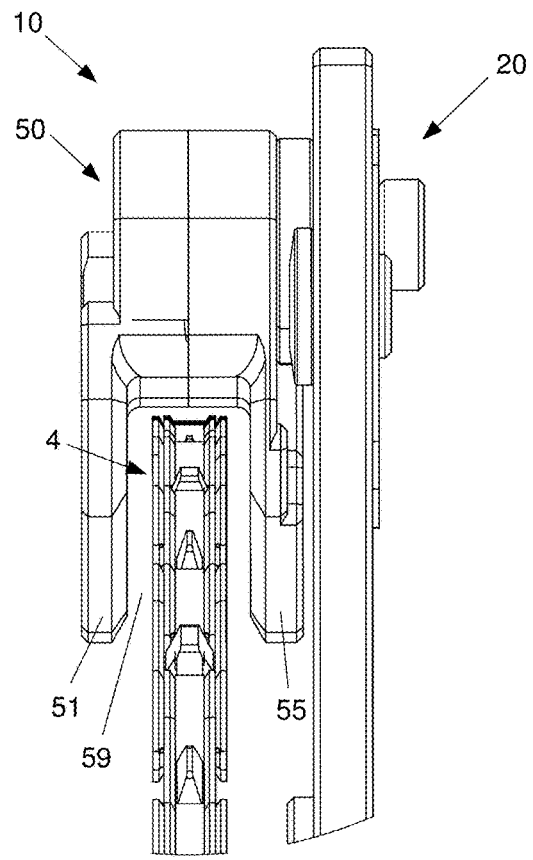
FIG. 25 is an enlarged view of the area within the broken line circle of FIG. 24.
Figure 24:
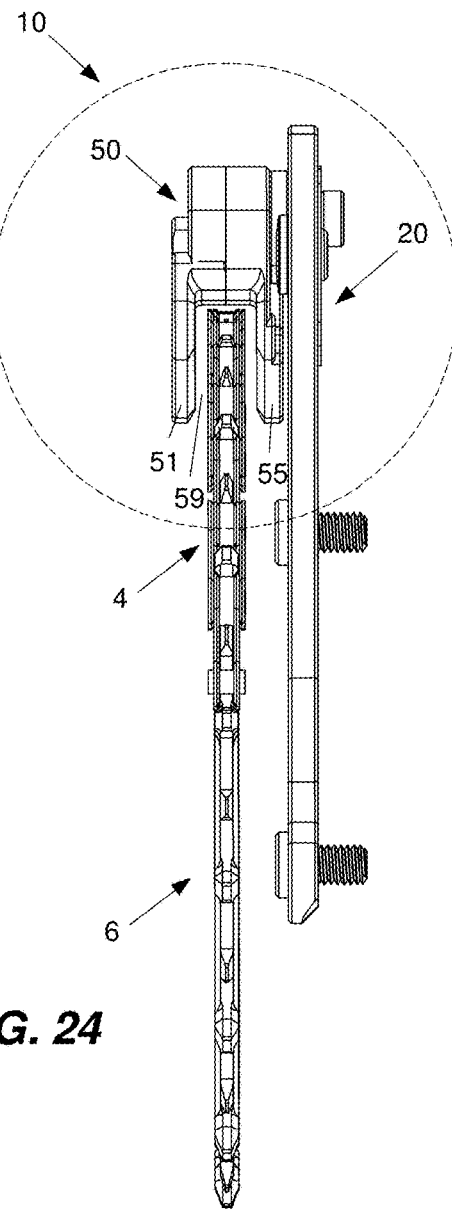
FIG. 24 is a right view of the chainguide of FIG. 22.
Figure 26A:
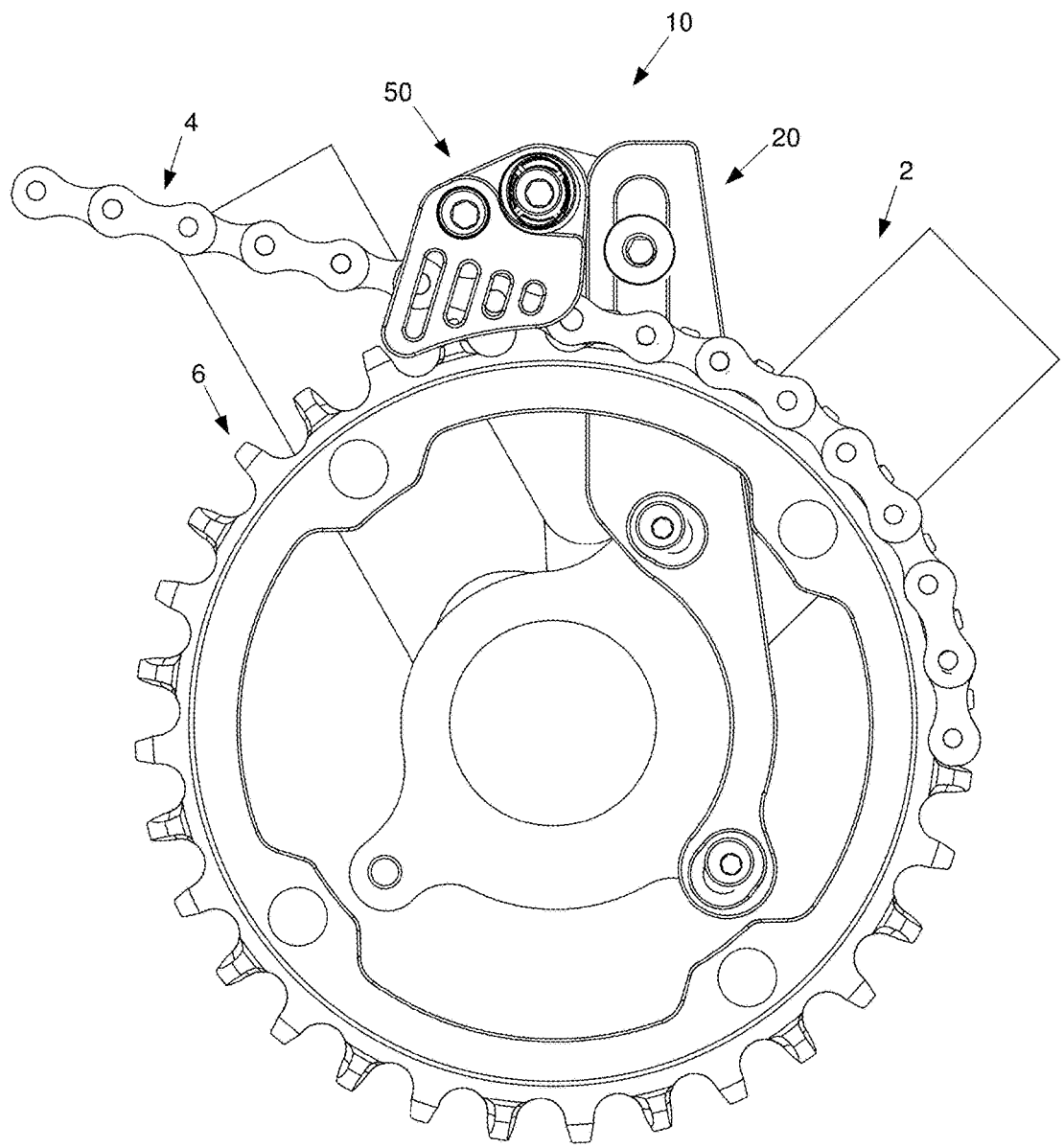
FIGS. 26a, 26b are front views of the chainguide of FIG. 22, illustrating examples of different positions of a guide member of the chainguide.
Figure 26B:
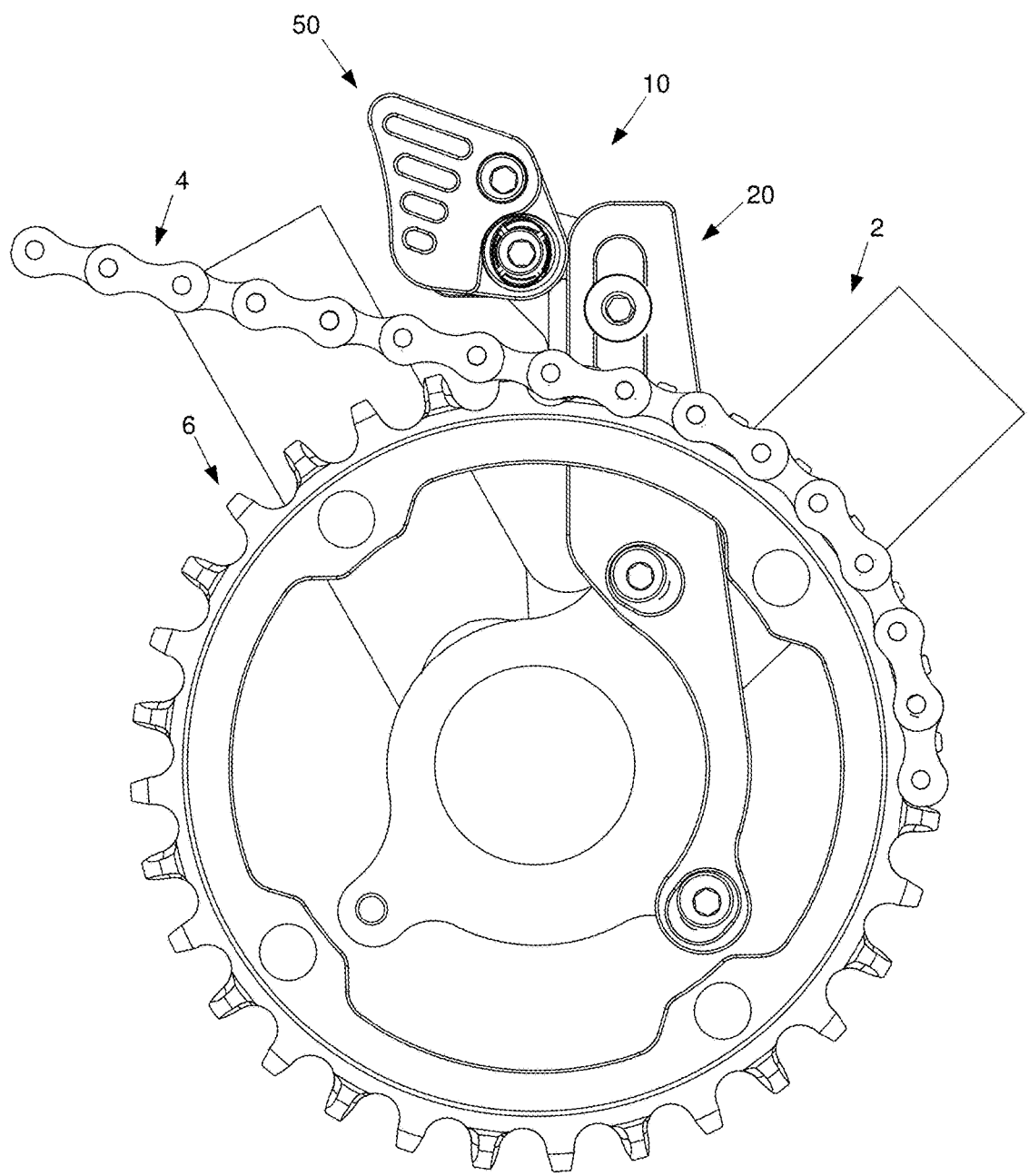

FIG. 22 is a right-front perspective view of an example of chainguide 10 secured to a bicycle 2 (only a portion of which is illustrated) and positioned to retain a chain 4 on a chainring 6 of bicycle 2, FIG. 23 is a left-front perspective view of chainguide 10 secured to bicycle 2, FIG. 24 is a right view of chainguide 10 positioned to retain chain 4 on chainring 6, FIG. 25 is an enlarged view of the area within the broken line circle of FIG. 24, and FIGS. 26a, 26b are front views of chainguide 10 secured to bicycle 2, illustrating examples of different positions of guide member 50 of chainguide 10. As illustrated in the example of FIGS. 23, 24, 25, chainguide 10 is secured to bicycle 2 by mounting bracket 20, and guide member 50 is positioned to guide chain 4 on or onto chainring 6 during rotation of chainring 6. More specifically, guide member 50 is positioned such that chain 4 passes through guide channel 59 between outer guide 51 and inner guide 55. As such, guide member 50, with outer guide 51 and inner guide 55, helps to restrain or retain chain 4 on chainring 6. As illustrated in the example of FIGS. 26a, 26b, and as described herein, guide member 50 is rotated between a "closed" position, as illustrated in the example of FIG. 26a, and an "open" position, as illustrated in the example of FIG. 26b, such that the open position of guide member 50 is established without impacting (i.e., while maintaining) the vertical adjustment and the lateral adjustment of guide number 50.

In one implementation, installation and adjustment of chainguide 10 on a bicycle includes:

1) Install mounting bracket 20 to mounting tabs of bicycle using anchor bolts 23.

2) Shift to largest cog on cassette.

3) Loosen vertical adjusting bolt 29 and adjust vertically to provide approx. 2 mm of clearance between top of chain and guide member 50.

4) Loosen mandrel expanding bolt 39 and position guide member 50 laterally such that inside edge of chain nearly touches inner guide 55 of guide member 50, and tighten mandrel expanding bolt 39 to secure guide member 50.

5) Shift across cassette and confirm that chain does not rub.

6) To remove chain, loosen guide fixing bolt 49 and rotate guide member 50 clockwise.

Figure 27:
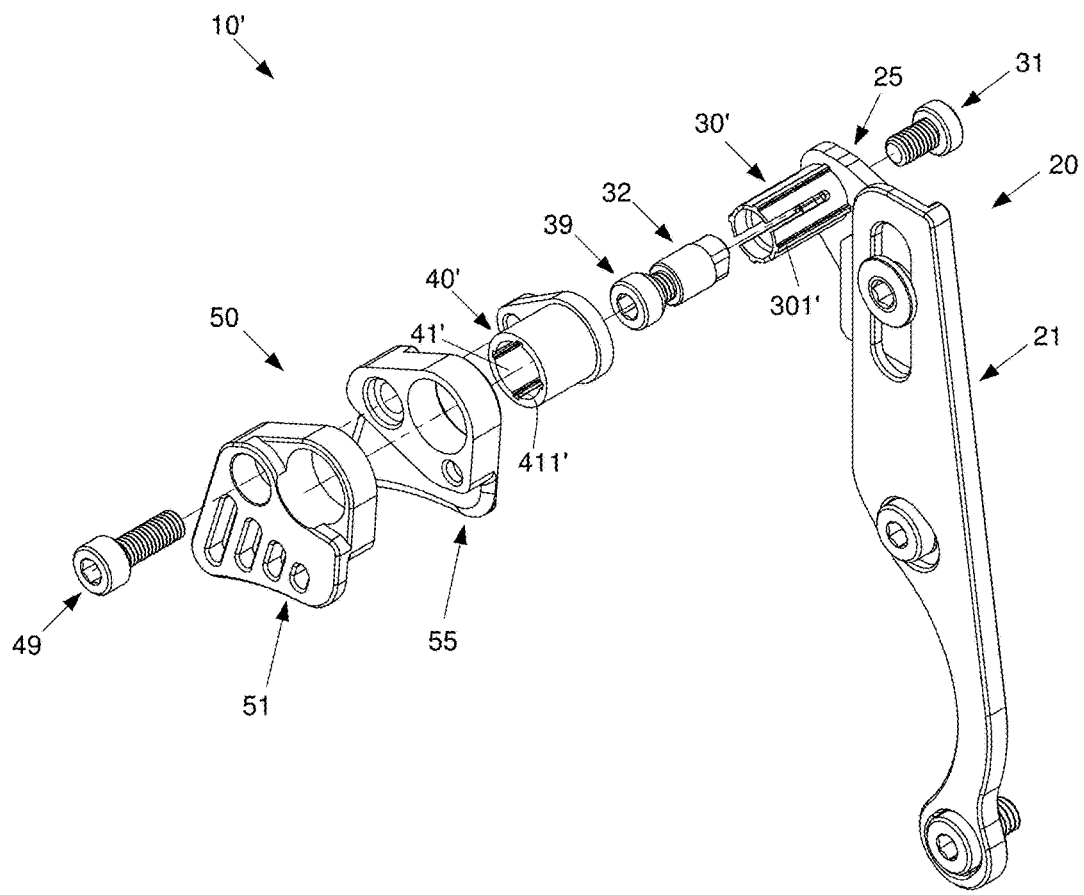
FIGS. 27, 28 are exploded perspective views of another example of a chainguide in accordance with the present disclosure.
Figure 28:
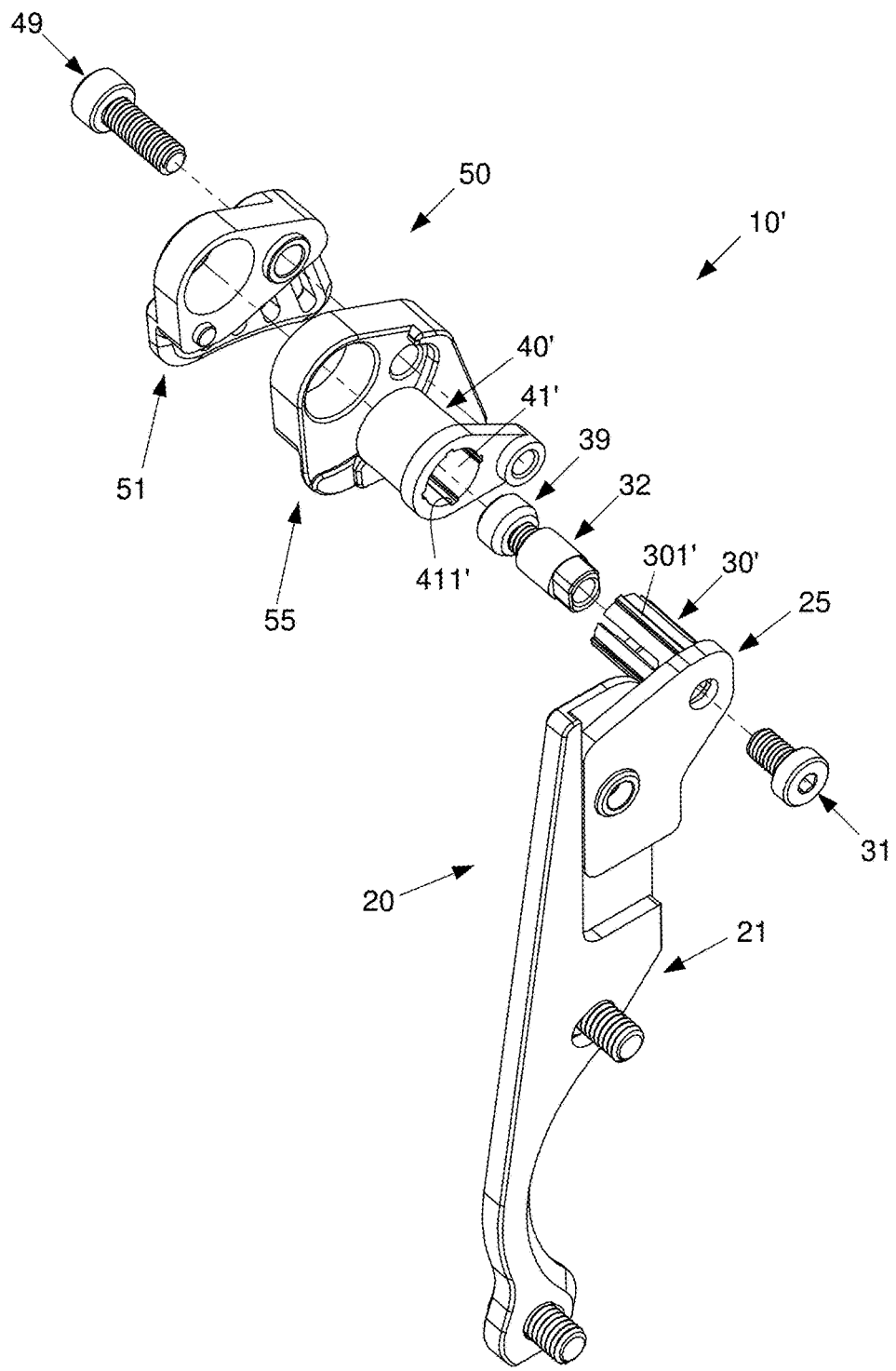
Figure 29:
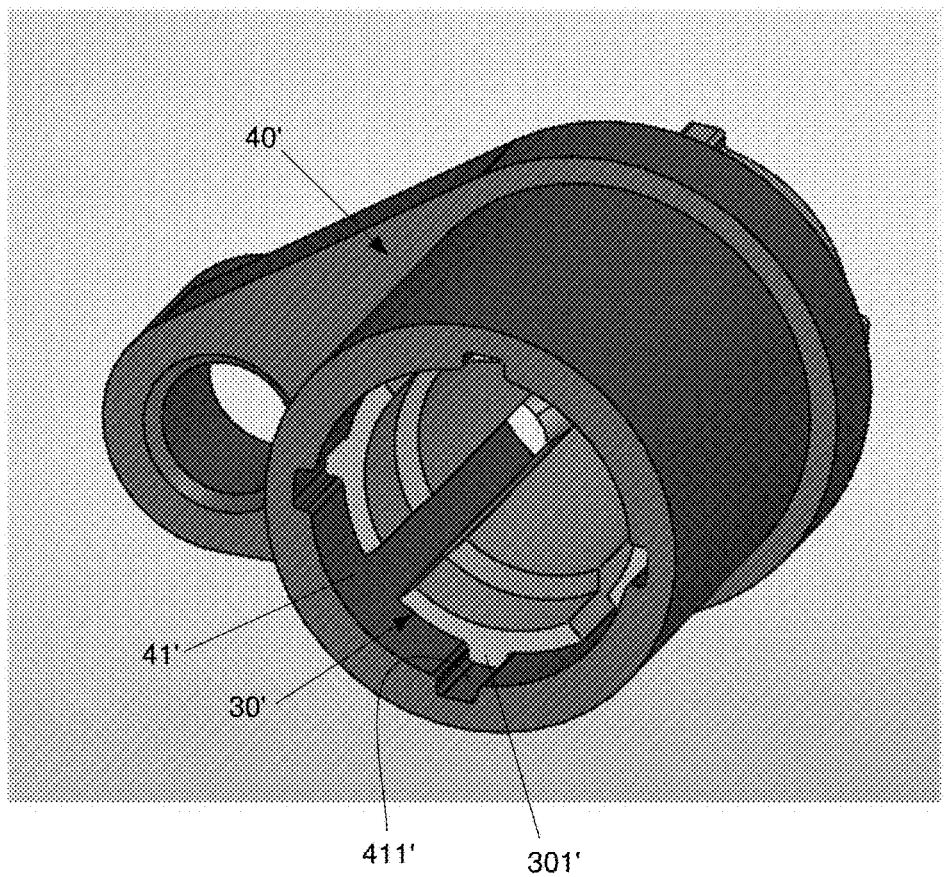
FIG. 29 is a perspective view of a portion of the chainguide of FIGS. 27, 28, illustrating an example of a guide sleeve of the chainguide.

FIGS. 27, 28 are exploded perspective views of another example of a chainguide 10' in accordance with the present disclosure, and FIG. 29 is a perspective view of a portion of chainguide 10', illustrating an example of a guide sleeve 40' of chainguide 10'. In one example, chainguide 10' includes an expanding mandrel 30' and guide sleeve 40', with the other components of chainguide 10' being similar to that of chainguide 10 of FIGS. 1-26b. As illustrated in the example of FIGS. 27, 28, 29, expanding mandrel 30' has a splined outer profile 301' and hole 41' of guide sleeve 40' has a corresponding splined (inner) profile 411'. As such, expanding mandrel 30' and guide sleeve 40' have a splined coupling such that, with guide sleeve 40' mounted on and supported by expanding mandrel 30', guide sleeve 40' is non-rotatable relative to expanding mandrel 30'.

FIGS. 30a, 30b are perspective views of a portion of chainguide 10', illustrating examples of different positions of guide sleeve 40' of chainguide 10'. As illustrated in the example of FIGS. 30a, 30b, guide sleeve 40' is slidable along expanding mandrel 30', as represented by arrow 402' (including in the reverse direction). Thus, guide sleeve 40' (with guide member 50 supported thereon) is laterally or axially adjustable relative to expanding mandrel 30'.

Figure 31:
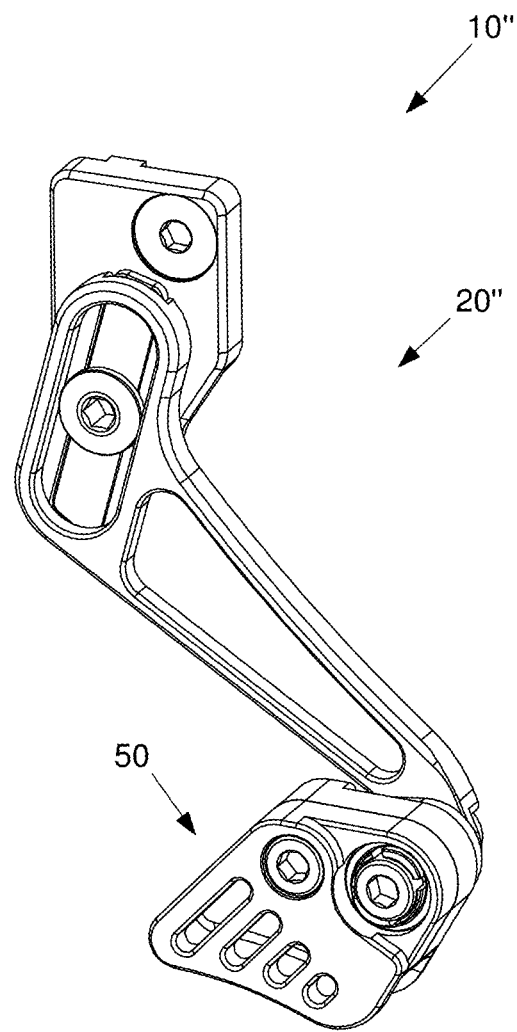
FIGS. 31, 32 are perspective and exploded perspective views, respectively, of another example of a chainguide in accordance with the present disclosure, illustrating another example of a mounting bracket of the chainguide.
Figure 32:
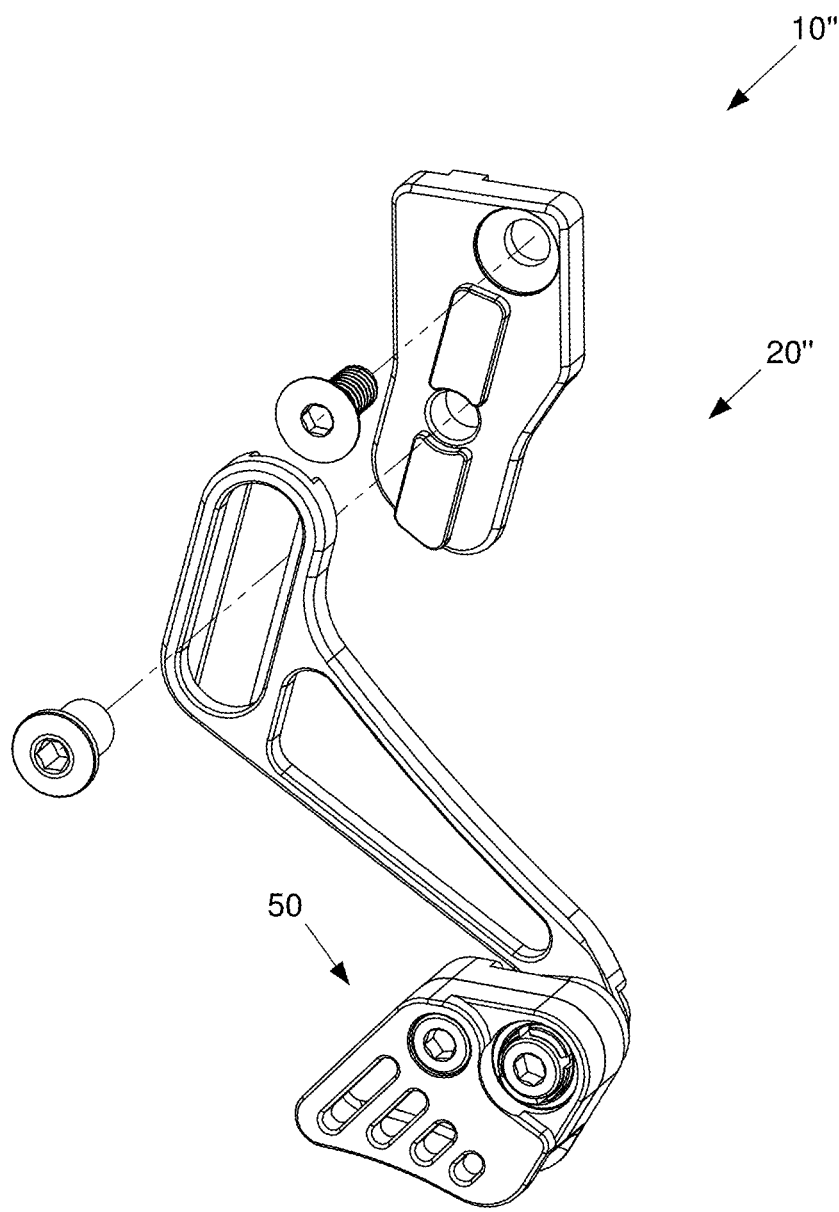
Figure 33:
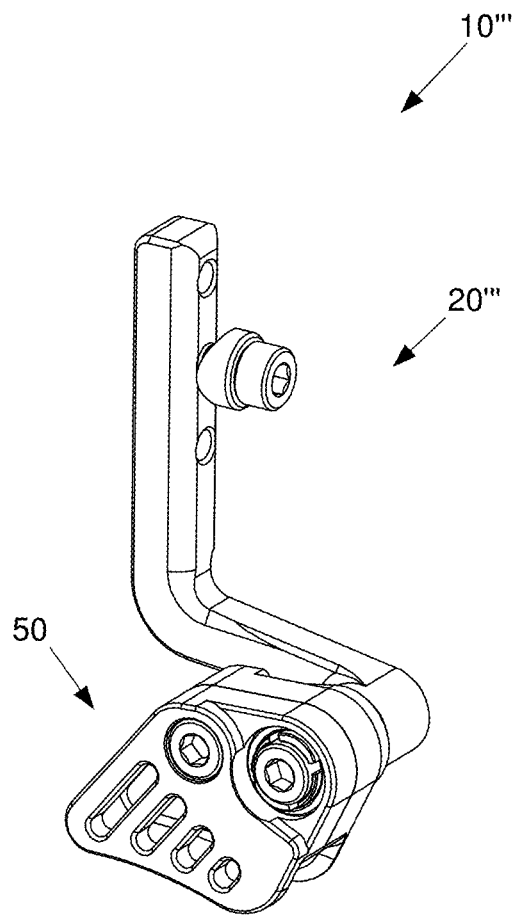
FIGS. 33, 34 are perspective and exploded perspective views, respectively, of another example of a chainguide in accordance with the present disclosure, illustrating another example of a mounting bracket of the chainguide.
Figure 34:
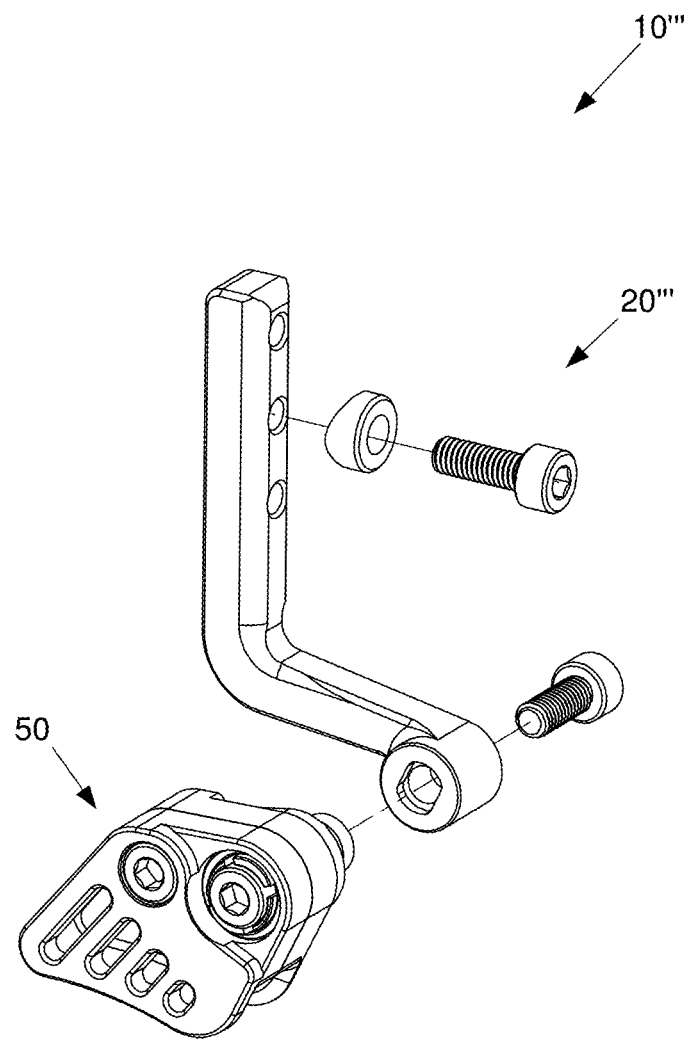

In one implementation, as illustrated in FIGS. 1-30b, mounting bracket 20 is illustrated for use with an ISCG-05 mount of a bicycle. Other mounting brackets may be provided for use with other mounts, including, for example, an S3/E-type mount (low direct mount), a high direct mount, or a braze-on mount. For example, as illustrated in the example of FIGS. 31, 32, chainguide 10" includes a mounting bracket 20" for use with a high direct mount of a bicycle (with the other components of chainguide 10" being similar to that of chainguide 10 and 10' of FIGS. 1-26b and FIGS. 27-30b). In addition, as illustrated in the example of FIGS. 33, 34, chainguide 10''' includes a mounting bracket 20''' for use with a braze-on mount of a bicycle (with the other components of chainguide 10''' being similar to that of chainguide 10 and 10' of FIGS. 1-26b and FIGS. 27-30b).

A chainguide as disclosed herein provides three separate adjustments or motions, including height adjustment, chainline adjustment, and rotating of the cage/guide assembly (i.e., guide member) out of the way (e.g., clockwise) so that the chain or chainring can be removed or guide parts replaced. More specifically, the disclosed chainguide provides for independent adjustment of height, chainline, and pivoting/rotation of the cage/guide assembly for chain removal. In addition, the disclosed chainguide provides for installation without removing crank arms.

With a chainguide as disclosed herein, the expanding mandrel system allows for chainline alignment without shims. More specifically, the disclosed chainguide does not rely on shims to adjust spacing of the guide member. As such, the disclosed chainguide provides non-shimmed continuous or infinite adjustment of the chainline, thereby allowing for more precise chainline alignment. Other existing chainguides rely on shims for chainline alignment such that the adjustment is incremental (i.e., thickness of the shim).

A chainguide as disclosed herein is compatible with oval/elliptical chainrings, allows for use with standard and "boost" bicycles and, in one implementation, accommodates a chainline from approximately 48 mm to 54 mm. In one implementation, the disclosed chainguide includes CNC machined 7075-T6 aluminum components with stainless steel hardware. Although the disclosed chainguide is illustrated and described as being used to retain a chain on a chainring of a bicycle, the disclosed chainguide may be used to guide, restrain or retain other chains.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A chainguide, comprising:
   a mounting bracket; and
   a guide member supported by the mounting bracket, the guide member rotatable relative to the mounting bracket about an axis and infinitely laterally adjustable relative to the mounting bracket along a length of the axis.

2. The chainguide of claim 1, wherein the guide member includes non-shimmed lateral adjustment.

3. The chainguide of claim 1, wherein the guide member is slidable relative to the mounting bracket along the length of the axis.

4. The chainguide of claim 1, wherein the guide member includes an outer guide and an inner guide providing a guide channel for a chain therebetween.

5. The chainguide of claim 1, wherein the mounting bracket is to mount the chainguide on a bicycle, and the guide member is to retain a chain on a chainring of the bicycle.

6. The chainguide of claim 1, further comprising:
   an expanding mandrel extended from the mounting bracket,
   the guide member slidably supported on the expanding mandrel.

7. The chainguide of claim 6, wherein the expanding mandrel has an unexpanded state in which the guide member is slidable and infinitely laterally adjustable relative to the mounting bracket, and an expanded state in which the guide member is fixed in a lateral position relative to the mounting bracket.

8. The chainguide of claim 6, further comprising:
   a guide sleeve slidably supported on and non-rotatably coupled with the expanding mandrel,
   the guide member supported by and rotatable relative to the guide sleeve.

9. The chainguide of claim 8, wherein the guide member has a rotatable state in which the guide member is rotatable relative to the guide sleeve and a non-rotatable state in which the guide member is non-rotatable relative to the guide sleeve.

10. The chainguide of claim 8, wherein the expanding mandrel and the guide sleeve have an elliptical coupling.

11. The chainguide of claim 8, wherein the expanding mandrel and the guide sleeve have a splined coupling.

12. A chainguide, comprising:
    a mounting bracket;
    a guide member supported by and infinitely laterally adjustable relative to the mounting bracket; and
    an expanding mandrel extended from the mounting bracket,
    the guide member slidably supported on the expanding mandrel.

13. The chainguide of claim 12, wherein the expanding mandrel has an unexpanded state in which the guide member is slidable and infinitely laterally adjustable relative to the mounting bracket, and an expanded state in which the guide member is fixed in a lateral position relative to the mounting bracket.

14. The chainguide of claim 12, further comprising:
    a guide sleeve slidably supported on and non-rotatably coupled with the expanding mandrel,
    the guide member supported by and rotatable relative to the guide sleeve.

15. The chainguide of claim 14, wherein the guide member has a rotatable state in which the guide member is rotatable relative to the guide sleeve and a non-rotatable state in which the guide member is non-rotatable relative to the guide sleeve.

16. The chainguide of claim 14, wherein the expanding mandrel and the guide sleeve have an elliptical coupling.

17. The chainguide of claim 14, wherein the expanding mandrel and the guide sleeve have a splined coupling.

18. The chainguide of claim 12, wherein the guide member includes non-shimmed lateral adjustment.

19. The chainguide of claim 12, wherein the guide member is infinitely laterally adjustable relative to the mounting bracket along an axis, and the guide member is rotatable relative to the mounting bracket about the axis.

20. The chainguide of claim 12, wherein the guide member includes an outer guide and an inner guide providing a guide channel for a chain therebetween.

21. The chainguide of claim 12, wherein the mounting bracket is to mount the chainguide on a bicycle, and the guide member is to retain a chain on a chainring of the bicycle.

22. A chainguide, comprising:
    an expanding mandrel;
    a guide sleeve supported by the expanding mandrel; and
    a guide member supported by the guide sleeve,
    the guide member rotatable relative to the guide sleeve,
    the guide sleeve non-rotatable relative to the expanding mandrel,
    the guide sleeve and the guide member jointly slidable along the expanding mandrel, and the expanding mandrel expandable to fix the guide sleeve and the guide member at a position along the expanding mandrel.

23. The chainguide of claim 22, wherein the guide member includes a guide channel for a chain.

24. The chainguide of claim 22, wherein the guide sleeve and the guide member are infinitely laterally adjustable along the expanding mandrel.

25. The chainguide of claim 22, wherein, with the guide sleeve at a fixed position along the expanding mandrel, the guide member is rotatable relative to the guide sleeve.

26. The chainguide of claim 22, wherein the guide member is securable to the guide sleeve for non-rotation relative to the guide sleeve.

27. The chainguide of claim 22, further comprising:
a mounting bracket to mount the chainguide,
the expanding mandrel extended from the mounting bracket.

28. The chainguide of claim 27, wherein the guide member is vertically adjustable with the mounting bracket.

29. The chainguide of claim 27, wherein, with the guide member at a fixed vertical position by the mounting bracket, the guide member is adjustable along the expanding mandrel and rotatable relative to the guide sleeve.

30. The chainguide of claim 27, wherein the mounting bracket is to mount the chainguide on a bicycle, and the guide member is to retain a chain on a chainring of the bicycle.

\* \* \* \* \*